(12) United States Patent
Naous et al.

(10) Patent No.: US 12,730,610 B2
(45) Date of Patent: Sep. 8, 2026

(54) INTEGRATED CIRCUIT WITH COMPUTE IN-MEMORY ARRAY AND METHOD OF OPERATING SAME

(71) Applicant: TAIWAN SEMICONDUCTOR MANUFACTURING COMPANY, LTD., Hsinchu (TW)

(72) Inventors: Rawan Naous, Hsinchu (TW); Kerem Akarvardar, Hsinchu (TW); Hidehiro Fujiwara, Hsinchu (TW); Haruki Mori, Hsinchu (TW); Yu-Der Chih, Hsinchu (TW); Mahmut Sinangil, Hsinchu (TW); Yih Wang, Hsinchu (TW); Jonathan Tsung-Yung Chang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 1079 days.

(21) Appl. No.: 17/589,638

(22) Filed: Jan. 31, 2022

(65) Prior Publication Data

US 2023/0050279 A1 Feb. 16, 2023

Related U.S. Application Data

(60) Provisional application No. 63/232,515, filed on Aug. 12, 2021.

(51) Int. Cl.
*G06F 7/544* (2006.01)

(52) U.S. Cl.
CPC .................................. *G06F 7/5443* (2013.01)

(58) Field of Classification Search
CPC ........ G06F 7/483; G06F 7/4876; G06F 7/523; G06F 7/5443; G06F 9/30025; G06F 5/01
See application file for complete search history.

(56) References Cited

U.S. PATENT DOCUMENTS 5,359,548 A * 10/1994 Yoshizawa .............. G06F 7/485
708/505
2013/0246491 A1* 9/2013 Panda ..................... G06F 7/509
708/518
2016/0211862 A1* 7/2016 Ho .......................... H03M 7/10
2019/0042244 A1* 2/2019 Henry ................. G06F 9/30014
2020/0042287 A1* 2/2020 Chalamalasetti ...... G06N 3/065
(Continued)

FOREIGN PATENT DOCUMENTS

WO WO-0205494 A1 * 1/2002 ............. H04L 49/90
WO WO-2020067908 A1 * 4/2020 ........... G06F 7/5443

*Primary Examiner* — James Trujillo
*Assistant Examiner* — Jakob Oscar Gudas
(74) *Attorney, Agent, or Firm* — Hauptman Ham, LLP

(57) ABSTRACT

An integrated circuit includes a first encoder, a compute in-memory (CIM) array and a de-encoder. The first encoder is configured to quantize a first received signal into a first signal. The first received signal has a first floating point number format. The first signal has an integer number format. The compute in-memory (CIM) array is coupled to the first encoder. The CIM array is configured to generate a CIM signal in response to at least the first signal. The CIM signal has the integer number format. The de-encoder is coupled to the CIM array, and is configured to generate a first output signal in response to the CIM signal. The first output signal has a second floating point number format.

20 Claims, 12 Drawing Sheets

(56) References Cited

U.S. PATENT DOCUMENTS

| | | | | |
|---|---|---|---|---|
| 2021/0326111 | A1* | 10/2021 | Langhammer | G06F 7/50 |
| 2022/0261650 | A1* | 8/2022 | Zhao | G06F 7/4876 |
| 2023/0141029 | A1* | 5/2023 | Haase | G06N 3/063 706/15 |

* cited by examiner

| Decimal | FP16 | Shift_adjust (8b) | Binary (1.M) | Quantized Output |
| --- | --- | --- | --- | --- |
| 0.25 | 0 01101 0000000000 | 5-2=3 | 01.000000 | 00001000 |
| -1.5 | 1 01111 1000000000 | 5+0=5 | 11.100000 | 11010000 |
| 3 | 0 10000 1000000000 | 5+1=6 | 01.100000 | 01100000 |

INTEGRATED CIRCUIT WITH COMPUTE IN-MEMORY ARRAY AND METHOD OF OPERATING SAME

PRIORITY CLAIM

This application claims the benefit of U.S. Provisional Application No. 63/232,515, filed Aug. 12, 2021, which is herein incorporated by reference in its entirety.

BACKGROUND

The semiconductor integrated circuit (IC) industry has produced a wide variety of digital devices to address issues in a number of different areas. Some of these digital devices, such as memory macros, are configured for the storage of data. As ICs have become smaller and more complex, the resistance of conductive lines within these digital devices are also changed affecting the operating voltages of these digital devices and overall IC performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
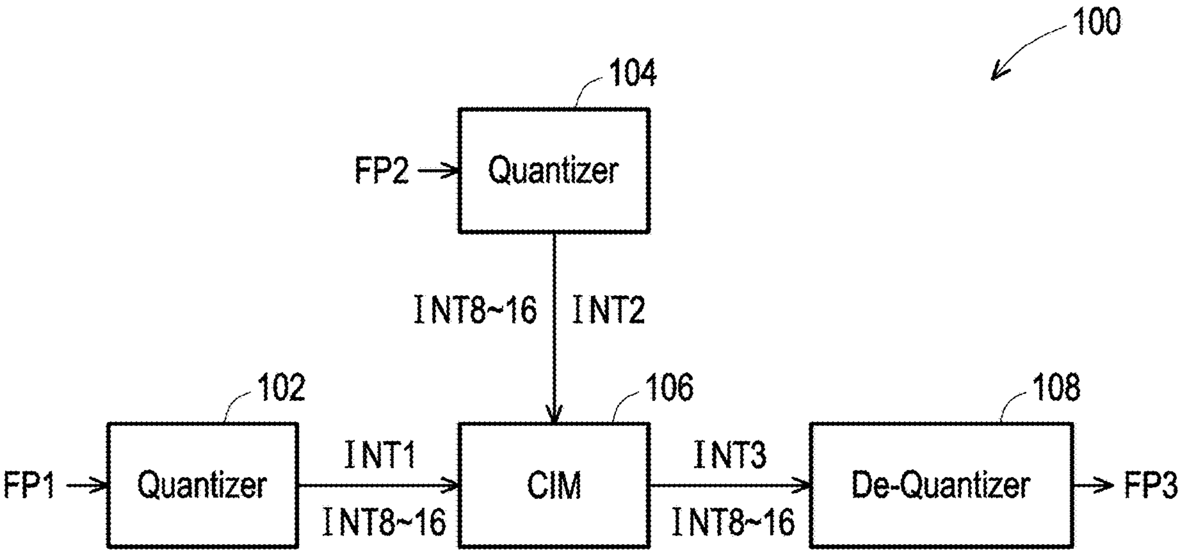
FIG. 1 is a block diagram of an integrated circuit, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, an integrated circuit includes a compute in-memory (CIM) array coupled to a first encoder, a second encoder and a de-encoder.

The first encoder is configured to quantize a first received signal into a first signal. The first received signal has a first floating point number format. The first signal has an integer number format.

The first encoder is configured to quantize a second received signal into a second signal. The second received signal has the first floating point number format. The second signal has the integer number format.

In some embodiments, the CIM array is configured to generate a CIM signal in response to at least the first signal or the second signal. In some embodiments, the CIM signal has the integer number format.

In some embodiments, the de-encoder is configured to generate a first output signal in response to the CIM signal. In some embodiments, the first output signal has a second floating point number format.

In some embodiments, by converting the first floating point number formats of the first received signal and the second received signal to the integer number format of the CIM signal, the CIM array is able to perform processing on signals with integer number formats, thereby reducing the amount of processing performed by the CIM array compared to other approaches.

In some embodiments, by reducing the amount of processing performed by the CIM array results in improved power efficiency compared to other approaches with vector multiplier accumulator (MAC) units.

Integrated Circuit

FIG. 1 is a block diagram of an integrated circuit 100, in accordance with some embodiments.

Integrated circuit 100 includes a quantizer 102, a quantizer 104, a compute in-memory (CIM) array 106 and a de-quantizer 108.

Quantizer 102 is coupled to CIM array 106. An input of quantizer 102 is configured to receive a set of received signals FP1. An output of quantizer 102 is configured to output a set of signals INT1. In some embodiments, each received signal in the set of received signals FP1 has a floating point number format. In some embodiments, each signal in the set of signals INT1 have an integer number format.

In some embodiments, the set of received signals FP1 includes 64 FP words. Other number of words within the set of received signals FP1 are within the scope of the present disclosure.

Quantizer 102 is configured to generate the set of signals INT1 in response to the set of received signals FP1. In some embodiments, quantizer 102 is configured to quantize the set of received signals FP1 into the set of signals INT1. In some embodiments, quantizing a first signal into a second signal includes changing a first format of the first signal into a second format of the second signal. In some embodiments, the second format of the second signal is different from the first format of the first signal. In some embodiments, the quantization performed by at least quantizer 102 or 104 is referred to as dynamic-fixed point quantization where the integer and fractional bit assignment (shown in FIGS. 3C-3D) of the integer format are variables that depend on the data range.

In some embodiments, quantizer 102 is configured to convert the floating-point number format of the set of signals FP1 into the integer number format of the set of received signals INT1. In some embodiments, quantizer 102 is also referred to as an encoder.

Quantizer 104 is coupled to CIM array 106. An input of quantizer 104 is configured to receive a set of received signals FP2. An output of quantizer 104 is configured to output a set of signals INT2. In some embodiments, each received signal in the set of received signals FP2 has a floating point number format. In some embodiments, each signal in the set of signals INT2 have an integer number format.

In some embodiments, the set of received signals FP2 includes 64 FP words. Other number of words within the set of received signals FP2 are within the scope of the present disclosure.

Quantizer 104 is configured to generate the set of signals INT2 in response to the set of received signals FP2. In some embodiments, quantizer 104 is configured to quantize the set of received signals FP2 into the set of signals INT2.

In some embodiments, quantizer 104 is configured to convert the floating-point number format of the set of signals FP2 into the integer number format of the set of received signals INT2. In some embodiments, quantizer 104 is also referred to as an encoder.

In some embodiments, at least the set of signals FP1 or the set of signals FP2 have an INT8 format or INT16 format.

Other configurations or formats for at least the set of signals FP1 or the set of signals FP2 are within the scope of the present disclosure.

Other configurations of at least quantizer 102 or 104 are within the scope of the present disclosure.

CIM array 106 is coupled to an output of quantizer 102, an output of quantizer 104 and an input of de-quantizer 108. An input of CIM array 106 is coupled to the output of quantizer 102 and another input of CIM array 106 is coupled to the output of quantizer 104. An output of CIM array 106 is coupled to an input of de-quantizer 108.

CIM array 106 is configured to generate a set of signals INT3 in response to the set of signals INT1 and the set of signals INT2. In some embodiments, the set of signals INT3 has the integer number format. In some embodiments, the set of signals FP3 has the INT8 format or INT16 format. Other configurations or formats for at least the set of signals FP3 are within the scope of the present disclosure.

In some embodiments, CIM array 106 includes a memory cell array coupled to one or more computation/multiplication blocks. In some embodiments, CIM array 106 is configured to perform vector multiplication of the set of signals INT1 by the set of signals INT2. In some embodiments, CIM array 106 performs one or more multiply-accumulate (MAC) operations.

In some embodiments, integrated circuit 100 is part of a neural network, and the set of received signals FP1 corresponds to an input vector, the set of received signals FP2 corresponds to weight vectors, and the CIM array is configured to multiply the input vector by the weight vectors, thereby generating the set of signals INT3.

In some embodiments, the input vector corresponds to data values based on the application type in one or more neural networks. In some embodiments, the weight vector corresponds to values of one or more trained filter coefficients within a particular layer of the one or more neural networks.

In some embodiments, the memory cell array in CIM array 106 is a volatile memory cell array including volatile memory cells. In some embodiments, each memory cell in the memory cell array of CIM array 106 corresponds to a static random-access memory (SRAM) cell. In some embodiments, each memory cell in the memory cell array of CIM array 106 corresponds to a dynamic random-access memory (DRAM) cell.

In some embodiments, memory cell array 102 is a non-volatile memory cell array including non-volatile memory cells. In some embodiments, each memory cell in the memory cell array of CIM array 106 corresponds to a magnetoresistive random-access memory (MRAM) cell. In some embodiments, each memory cell in the memory cell array of CIM array 106 corresponds to a phase-change memory (PCM) cell. In some embodiments, each memory cell in the memory cell array of CIM array 106 corresponds to a phase-change RAM (PRAM) cell. In some embodiments, each memory cell in the memory cell array of CIM array 106 corresponds to a Ferroelectric RAM (FeRAM) cell. In some embodiments, each memory cell in the memory cell array of CIM array 106 corresponds to a Ferroelectric Field Effect Transistor (FeFET) cell.

Other types of memory cells in the memory cell array of CIM array 106 are within the scope of the present disclosure.

Other configurations of CIM array 106 are within the scope of the present disclosure.

De-quantizer 108 is coupled to CIM array 106. An input of de-quantizer 108 is configured to receive the set of signals INT3. An output of de-quantizer 108 is configured to output a set of output signals FP3.

De-quantizer 108 is configured to generate a set of output signals FP3 in response to the set of signals INT3. In some embodiments, the set of output signals FP3 have the floating point number format.

In some embodiments, de-quantizer 108 is configured to de-quantize the set of signals INT3 into the set of output signals FP3. In some embodiments, de-quantizing a signal is the inverse of quantizing the signal performed by at least quantizer 102 or 104. In some embodiments, de-quantizing the first signal into the second signal includes changing the first format of the first signal into the second format of the second signal.

In some embodiments, de-quantizer 108 is configured to convert the integer number format of the set of signals INT3 into the floating-point number format of the set of signals INT3. In some embodiments, de-quantizer 108 is also referred to as a decoder.

Other configurations of de-quantizer 108 are within the scope of the present disclosure.

In some embodiments, the floating-point number format of the set of received signals FP1 or FP2 or the set of output signals FP3 includes a half precision (e.g., a "FP16 format"). In some embodiments, FP16 includes 16 bits. Other floating-point number formats for the set of received signals FP1 or FP2 or the set of output signals FP3 are within the scope of the present disclosure. For example, in some embodiments, the floating-point number format of the set of received signals FP1 or FP2 or the set of output signals FP3 includes one or more of 32-bit, 64-bit, 128-bit, 256-bit floating-point format. In some embodiments, the floating-point number format of the set of received signals FP1 or FP2 or the set of output signals FP3 includes one or more floating-point formats in Institute of Electrical and Electronics Engineers (IEEE)-754.

In some embodiments, the integer number format of the set of signals INT1, INT2 or INT3 includes 8 bits or 16 bits. Other number of bits in the integer format for the set of signals INT1, INT2 or INT3 are within the scope of the present disclosure.

In some embodiments, two or more of at least quantizer 102, quantizer 104, CIM array 106 or de-quantizer 108 are combined into a single circuit.

In some embodiments, by converting the floating point number formats of the set of received signals FP1 and FP2 to the integer number format of the corresponding set of signals INT1 and INT2, the CIM array 106 is able to perform processing on signals with integer number formats, thereby reducing the amount of processing performed by the CIM array 106 compared to other approaches. In some embodiments, by reducing the amount of processing performed by the CIM array 106 results in improved power efficiency compared to other approaches with vector multiplier accumulator (MAC) units.

In some embodiments, by using the encoder circuit 400 or 500 of the present disclosure, the quantization from floating point format to integer format performed by encoder circuit 400 or 500 is based on a scaling factor that is a multiple of 2. In some embodiments, by using a scaling factor that is a multiple of 2, shift operations can be employed which simplifies the quantization process from floating point format to integer format compared to other approaches.

Other configurations or number of elements in integrated circuit 100 are within the scope of the present disclosure.

Method

Figure 2:
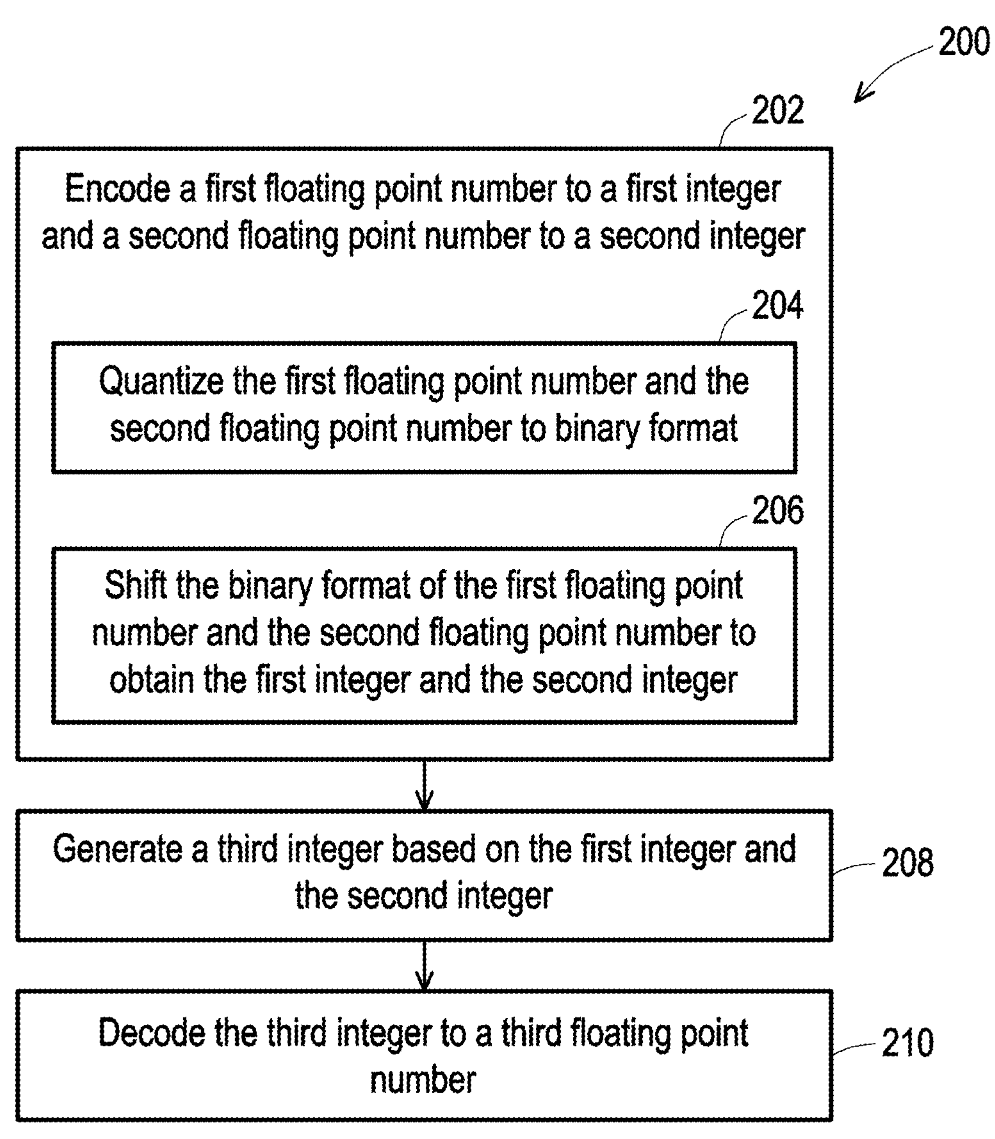
FIG. 2 is a flowchart of a method of operating an integrated circuit, in accordance with some embodiments.

FIG. 2 is a flowchart of a method 200 of operating an integrated circuit, in accordance with some embodiments.

Figure 4:
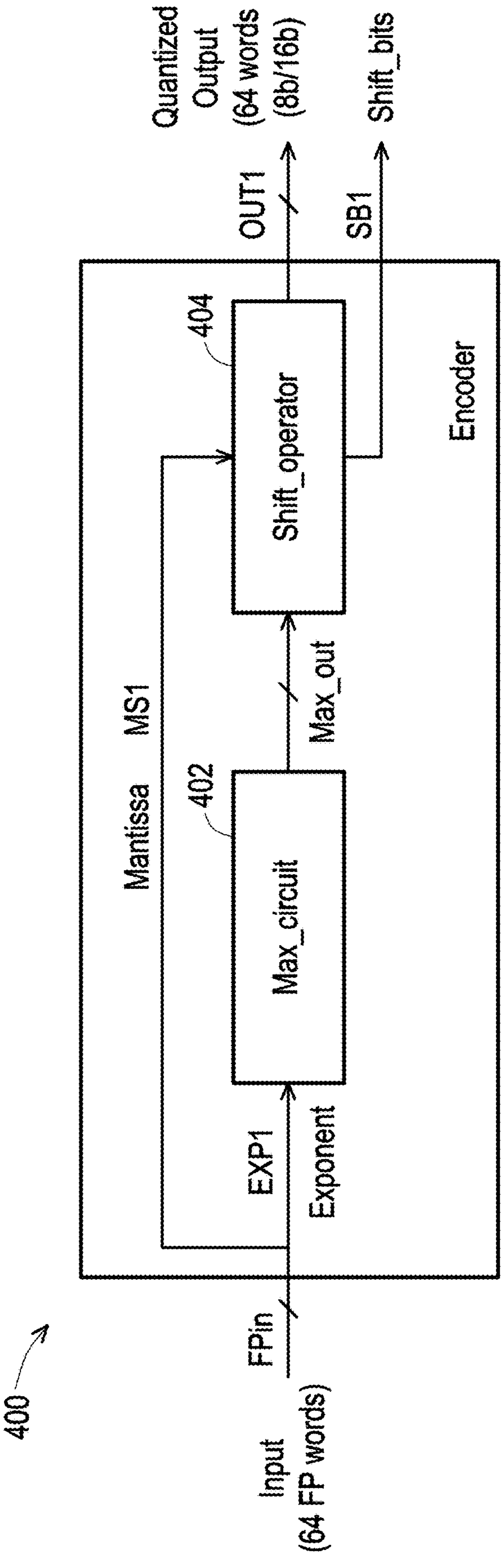
FIG. 4 is a circuit diagram of an encoder circuit, in accordance with some embodiments.
Figure 5:
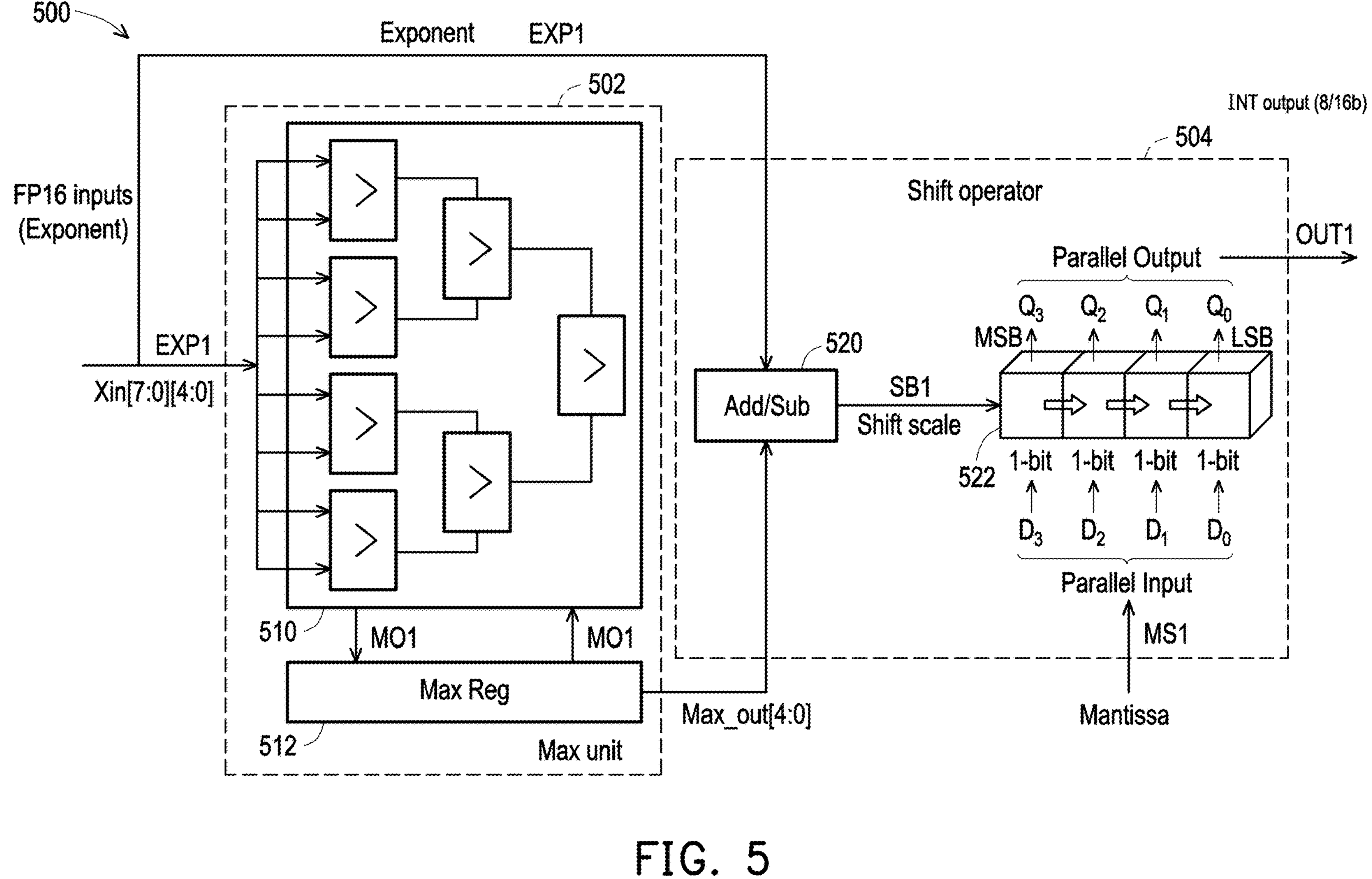
FIG. 5 is a circuit diagram of an encoder circuit, in accordance with some embodiments.
Figure 7:
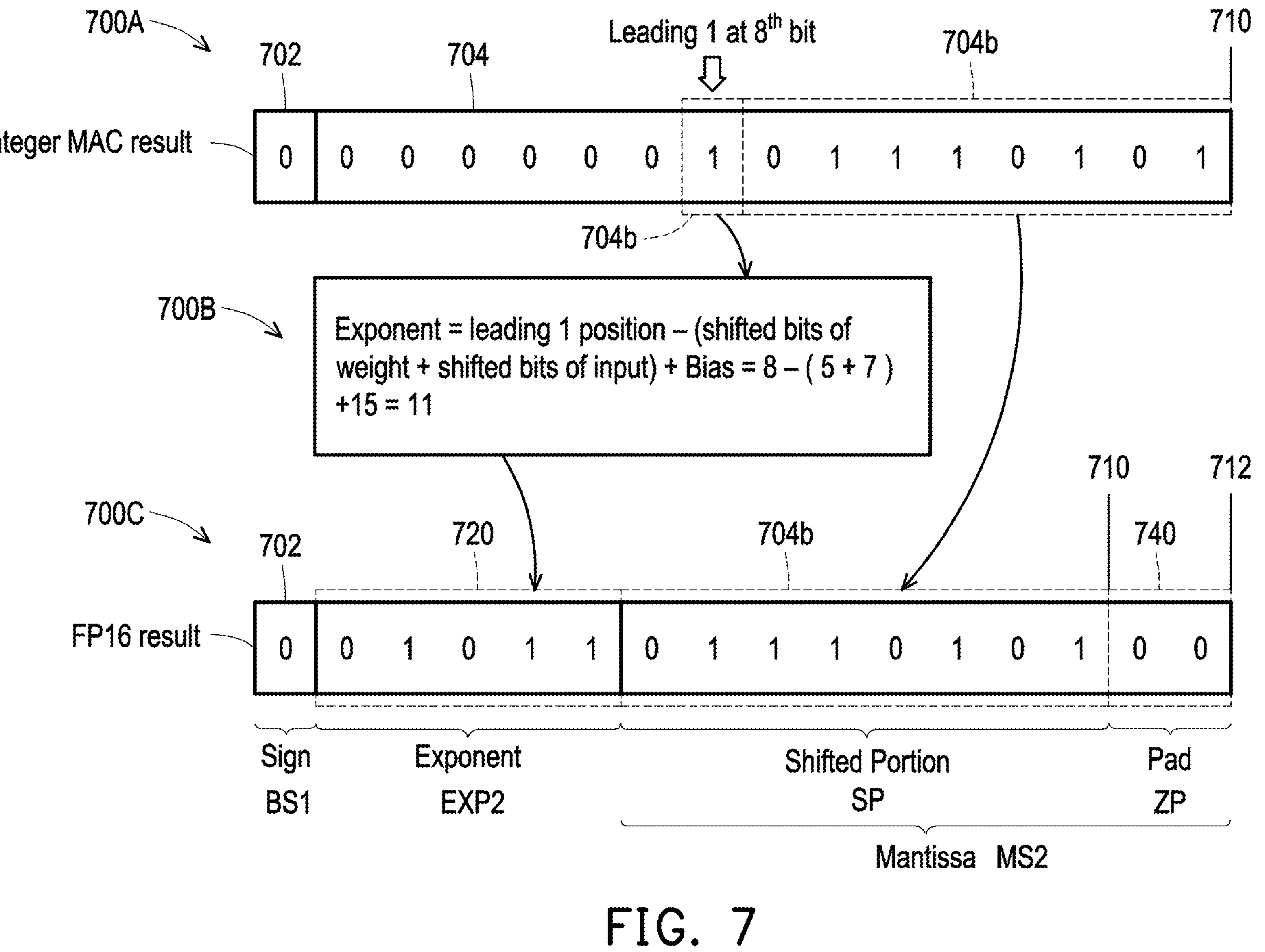
FIG. 7 is a diagram of a graphical illustration of at least part of operation 210 of a method, such as the method of FIG. 2, in accordance with some embodiments.
Figure 8:
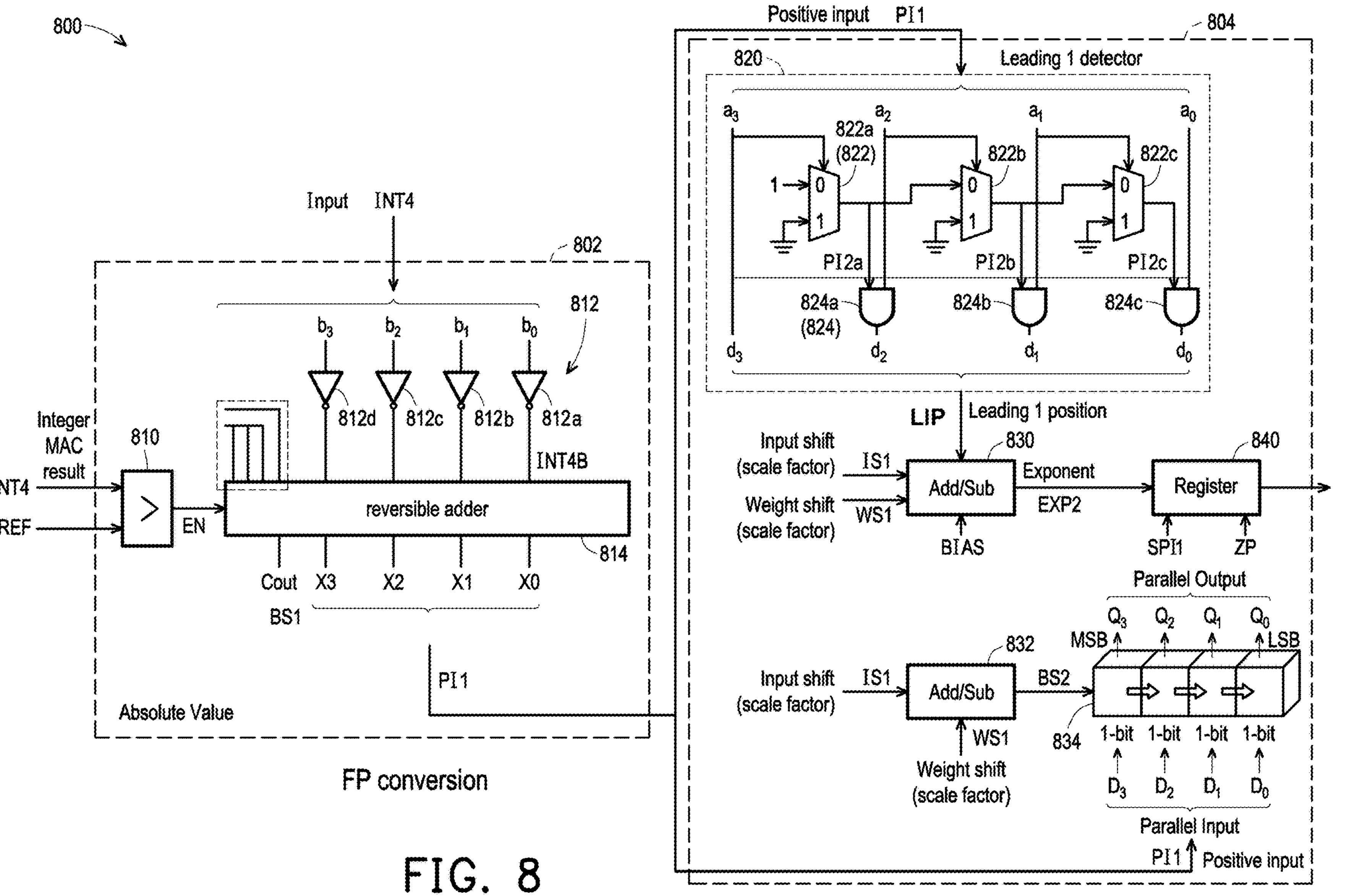
FIG. 8 is a circuit diagram of a decoder circuit, in accordance with some embodiments.
Figure 9:
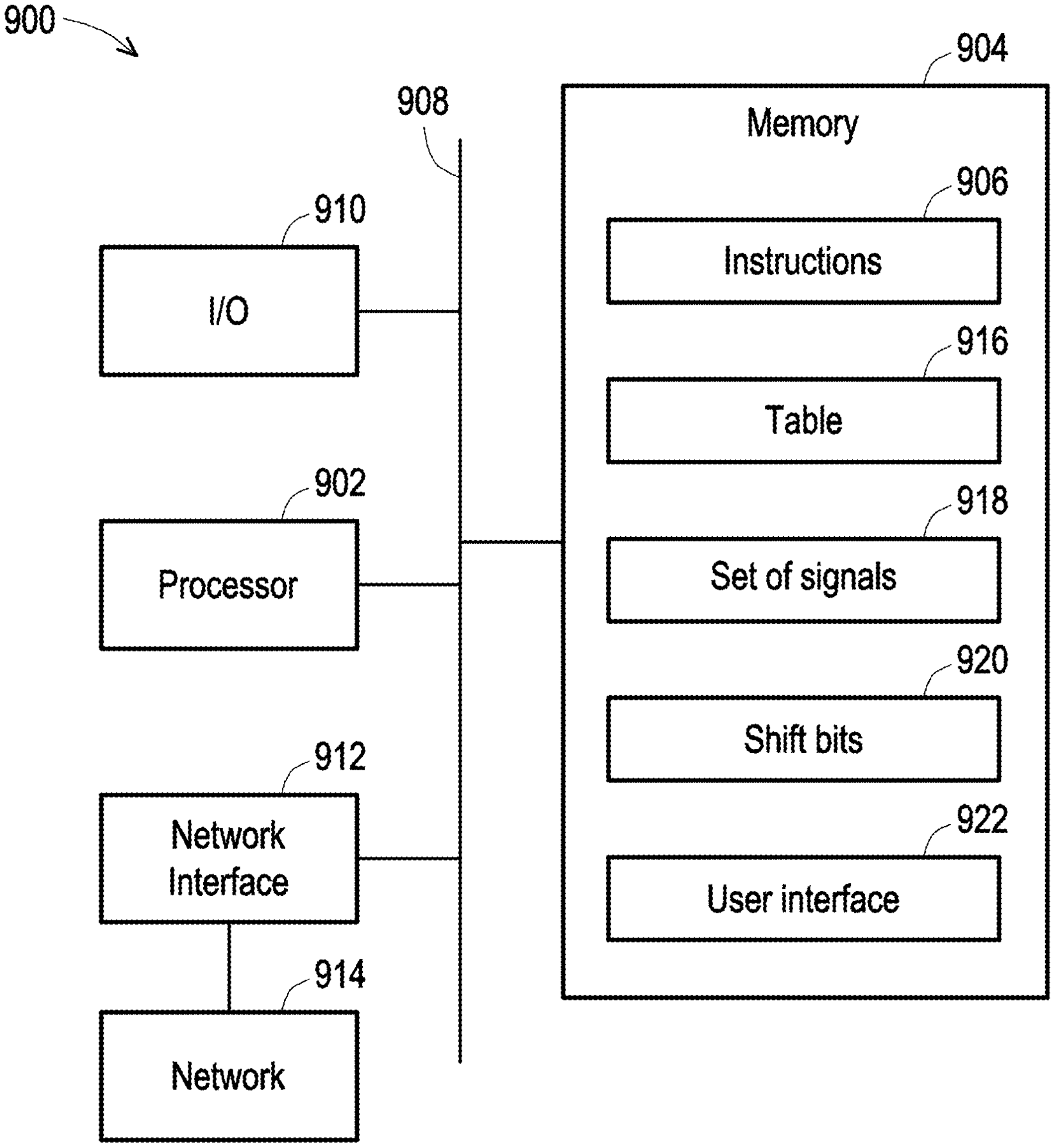
FIG. 9 is a schematic view of a system, in accordance with some embodiments.

In some embodiments, FIG. 2 is a flowchart of a method of operating one or more of integrated circuit 100 of FIG. 1, encoder circuit 400 of FIG. 4, encoder circuit 500 of FIG. 5, decoder circuit 700 of FIG. 7, decoder circuit 800 of FIG. 8, and system 900 of FIG. 9. It is understood that additional operations may be performed before, during, and/or after the method 200 depicted in FIG. 2, and that some other operations may only be briefly described herein. In some embodiments, other order of operations of method 200 is within the scope of the present disclosure. In some embodiments, one or more operations of method 200 are not performed.

Method 200 includes exemplary operations, but the operations are not necessarily performed in the order shown. Operations may be added, replaced, changed order, and/or eliminated as appropriate, in accordance with the spirit and scope of disclosed embodiments. It is understood that method 200 utilizes features of one or more of integrated circuit 100 of FIG. 1, encoder circuit 400 of FIG. 4, encoder circuit 500 of FIG. 5, decoder circuit 700 of FIG. 7, decoder circuit 800 of FIG. 8, and system 900 of FIG. 9.

Figures 3A, 3B:
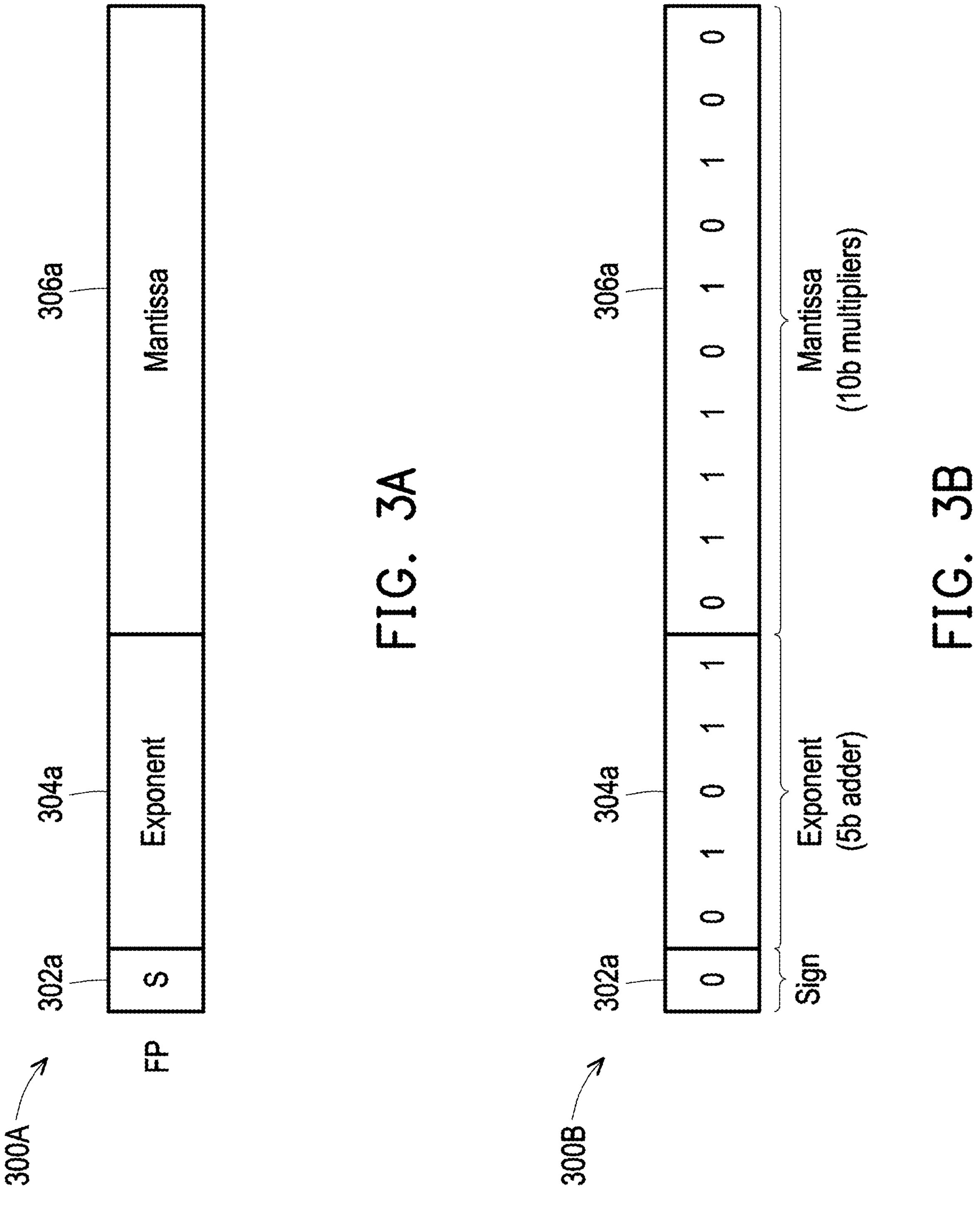
FIG. 3A is a diagram of a number, in accordance with some embodiments.
FIG. 3B is a diagram of a number, in accordance with some embodiments.
Figures 3C, 3D:
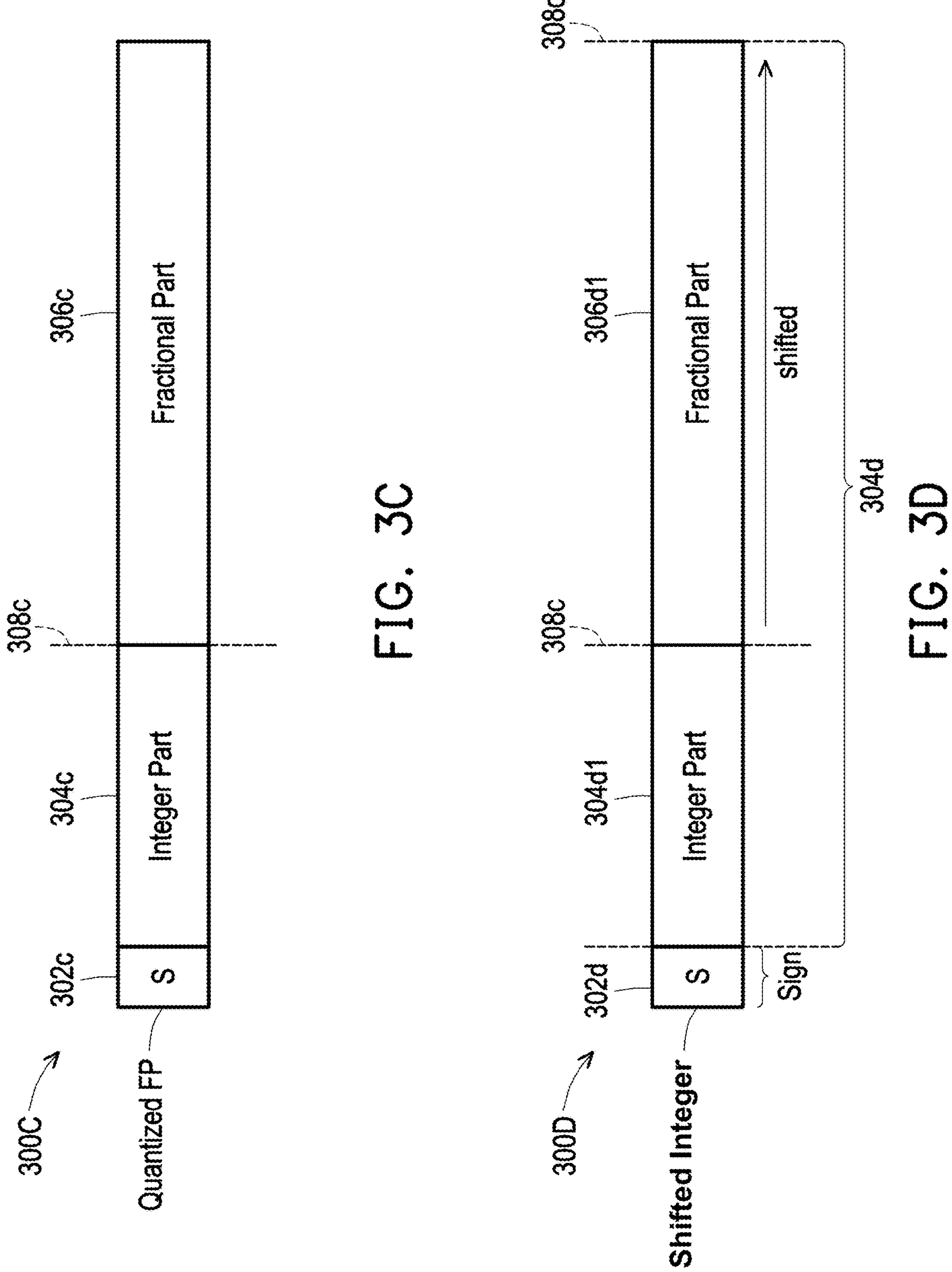
FIG. 3C is a diagram of a number, in accordance with some embodiments.
FIG. 3D is a diagram of a number, in accordance with some embodiments.
Figure 3E:
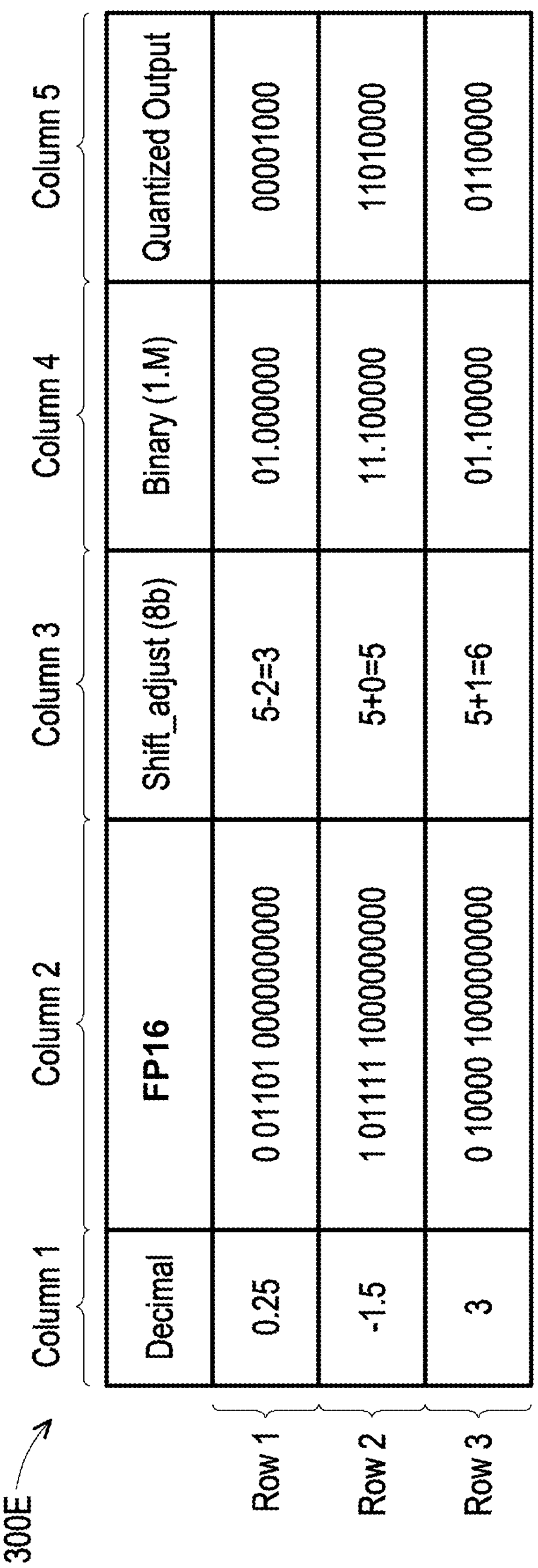
FIG. 3E is a diagram of a table, in accordance with some embodiments.
Figures 3F, 3G:
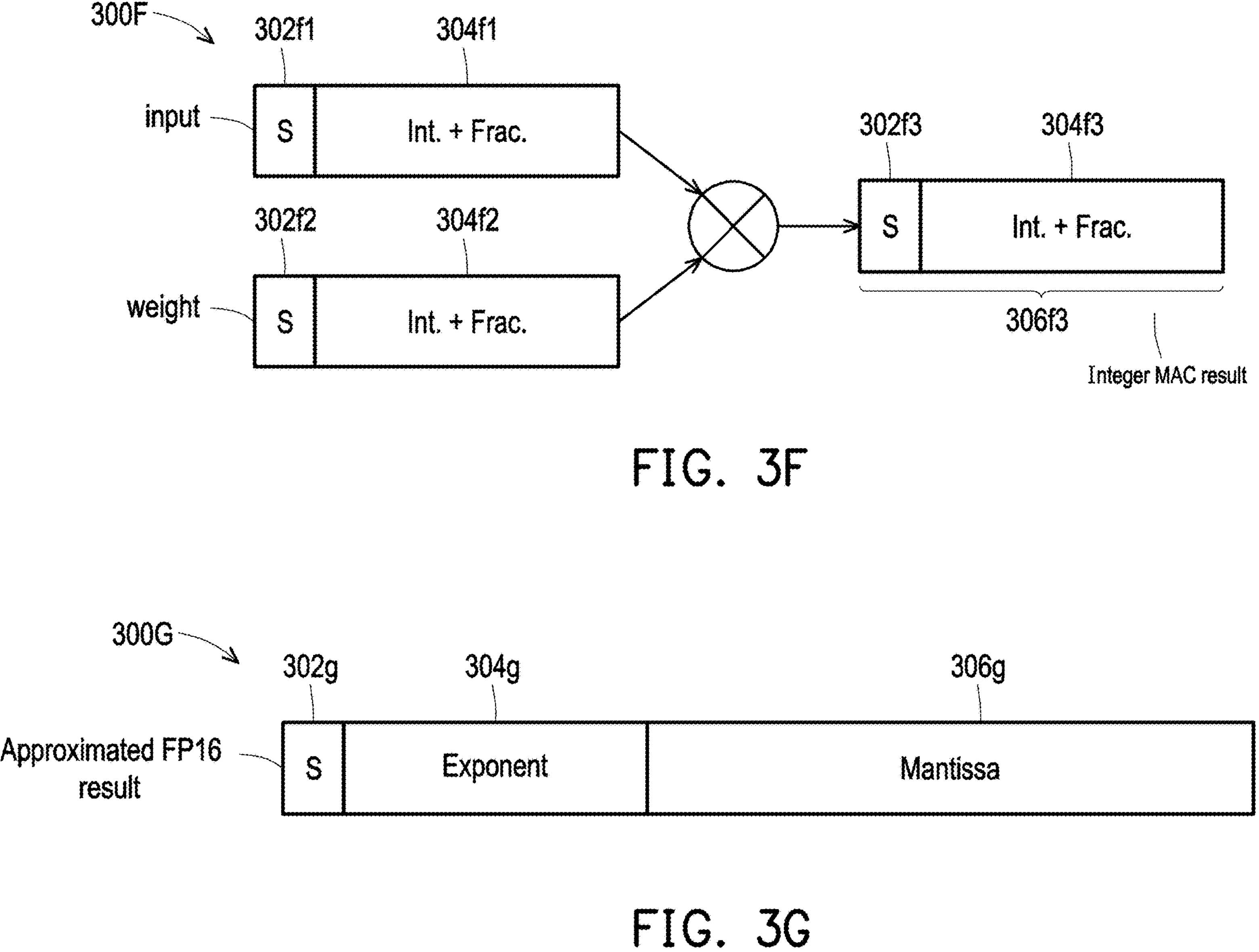
FIG. 3F is a diagram of a graphical illustration of at least part of operation 208 of a method, such as the method of FIG. 2, in accordance with some embodiments.
FIG. 3G is a diagram of a number, in accordance with some embodiments.

It is understood that method 200 utilizes features of one or more of number 300A of FIG. 3A, number 300B of FIG. 3B, number 300C of FIG. 3C, number 300D of FIG. 3D, table 300E of FIG. 3E, numbers 300F of FIG. 3F, number 300G of FIG. 3G, numbers 700A and 700C of FIG. 7 and exponent 700B of FIG. 7.

In operation 202 of method 200, a first floating point number is encoded to a first integer and a second floating point number is encoded to a second integer.

In some embodiments, the first floating point number of method 200 includes the set of received signals FP1. In some embodiments, the second floating point number of method 200 includes the set of received signals FP2. In some embodiments, the first integer of method 200 includes the set of signals INT1. In some embodiments, the second integer of method 200 includes the set of signals INT2.

In some embodiments, the first floating point number of method 200 is shown as number 300A of FIG. 3A or number 300B of FIG. 3B. In some embodiments, the second floating point number of method 200 is shown as number 300A of FIG. 3A or number 300B of FIG. 3B.

In some embodiments, the first floating point number of method 200 is shown as the FP16 entries for rows 1-3 in column 2 in table 300E of FIG. 3E. In some embodiments, the second floating point number of method 200 is shown as the FP16 entries for rows 1-3 in column 2 in table 300E of FIG. 3E.

In some embodiments, the first integer of method 200 is shown as number 300D of FIG. 3D. In some embodiments, the second integer of method 200 is shown as number 300D of FIG. 3D. In some embodiments, the first integer of method 200 is shown as the quantized output for rows 1-3 in column 5 in table 300E of FIG. 3E. In some embodiments, the second integer of method 200 is shown as the quantized output for rows 1-3 in column 5 in table 300E of FIG. 3E.

In some embodiments, in operation 202, the first floating point number is encoded by quantizer 102 into the first integer. In some embodiments, in operation 202, the second floating point number is encoded by quantizer 104 into the second integer.

In some embodiments, operation 202 includes at least operation 204 or 206.

In operation 204 of method 200, the first floating point number and the second floating point number are quantized to a corresponding first and second binary number.

In some embodiments, in operation 204, the first floating point number is quantized by quantizer 102 into the first binary number. In some embodiments, in operation 204, the second floating point number is quantized by quantizer 104 into the second binary number.

In some embodiments, at least the first binary number of method 200 or the second binary number of method 200 corresponds to normalized binary representation. In some embodiments, for normalized binary representation, except for zero, a real number is represented with 1 integer and a fractional part, and is shown as "1.fff", and also shown for rows 1-3 in column 4 in table 300E of FIG. 3E. In some embodiments, the first binary number of method 200 is shown as number 300C of FIG. 3C. In some embodiments, the second binary number of method 200 is shown as number 300C of FIG. 3C. In some embodiments, the first binary number of method 200 is shown for rows 1-3 in column 4 in table 300E of FIG. 3E. In some embodiments, the second binary number of method 200 is shown for rows 1-3 in column 4 in table 300E of FIG. 3E.

In operation 206 of method 200, the first binary number of the first floating point number is shifted thereby obtaining the first integer, and the second binary number of the second floating point number is shifted thereby obtaining the second integer.

In some embodiments, the first binary number of the first floating point number is shifted by a first number of shift bits thereby obtaining the first integer. In some embodiments, the first number of shift bits of method 200 includes a shift bits signal SB1. In some embodiments, the first number of shift bits of method 200 includes a shift bits signal IS1. In some embodiments, the first binary number of the first floating point number is shifted by a first shift register. In some embodiments, the first shift register of method 200 includes a shift register 522.

In some embodiments, the second binary number of the second floating point number is shifted by a second number of shift bits thereby obtaining the second integer. In some embodiments, the second number of shift bits of method 200 includes shift bits signal SB1. In some embodiments, the second number of shift bits of method 200 includes a shift bits signal WS1. In some embodiments, the second binary number of the second floating point number is shifted by a second shift register. In some embodiments, the second shift register of method 200 includes shift register 522.

In some embodiments, the first number of shift bits of method 200 is shown for rows 1-3 in column 3 in table 300E of FIG. 3E. In some embodiments, the second number of shift bits of method 200 is shown for rows 1-3 in column 3 in table 300E of FIG. 3E.

In operation 208 of method 200, a third integer is generated based on the first integer and the second integer.

In some embodiments, the third integer of method 200 includes the set of signals INT3. In some embodiments, in operation 208, the third integer is generated by CIM array 106. In some embodiments, the third integer of method 200 is shown as number 700A of FIG. 7. In some embodiments, the third integer of method 200 is shown as number **306*f*3 of FIG. 3**F.

In operation 210 of method 200, the third integer is decoded to a third floating point number.

In some embodiments, in operation 210, the third integer is decoded to the third floating point number by de-quantizer 108.

In some embodiments, the third floating point number of method 200 includes the set of output signals FP3. In some embodiments, the third floating point number of method 200 includes the set of output signals OUT1. In some embodiments, the third floating point number of method 200 is shown as number 300G of FIG. 3G. In some embodiments, the third floating point number of method 200 is shown as number 700C of FIG. 7.

In some embodiments, decoding the third integer to the third floating point number comprises determining a positive signal PI1 and a sign bit BS1 in response to the CIM signal, and determining the third floating point number in response to the positive signal PI1, the sign bit BS1, the first number of shifted bits and the second number of shifted bits.

In some embodiments, the positive signal PI1 is an absolute value of the third integer, and the sign bit BS1 is a corresponding sign of the third integer.

In some embodiments, an absolute value detector circuit 602 (FIG. 6) is configured to determine the positive signal and the sign bit.

In some embodiments, a detector circuit 604 (FIG. 6) is configured to determine the third floating point number in response to the positive signal PI1, the sign bit BS1, the first number of shifted bits and the second number of shifted bits.

In some embodiments, determining the third floating point number comprises determining, by a set of multiplexers 822 and a set of AND logic gates 824, a leading one position (shown in number 700A of FIG. 7) of the positive signal PH.

In some embodiments, determining the third floating point number further comprises determining an exponent EXP2 (FIGS. 7-8) of the third floating point number in response to the leading one position of the positive signal PI1, the first number of shifted bits, the second number of shifted bits and an exponential bias BIAS.

In some embodiments, determining the third floating point number further comprises determining a mantissa MS2 (FIG. 7) of the third floating point number by shifting the positive signal PH a third number of bits away from an end of the positive signal, and padding the end of the positive signal with zeros ZP (FIG. 7).

In some embodiments, the third number of bits of method 200 includes shift bits BS2. In some embodiments, the third number of bits is a difference between the first number bits and second number of bits.

By operating at least method 200, the integrated circuit operates to achieve the benefits discussed above with respect to integrated circuit 100, encoder circuit 400 or 500, or decoder circuit 600 or 800.

FIG. 3A is a diagram of a number 300A, in accordance with some embodiments.

Number 300A is an embodiment of at least a received signal of the set of received signals FP1 or FP2 of FIG. 1, and similar detailed description is therefore omitted.

Components that are the same or similar to those in one or more of FIGS. 1-9 are given the same reference numbers, and detailed description thereof is thus omitted.

Number 300A is a floating point number with base 2. Number 300A includes a sign **302*a*, an exponent 304*a* and a mantissa 306*a*. The sign 302*a* corresponds to the sign of the floating point number (e.g., number 300A). The exponent 304*a* corresponds to the exponent of the floating point number (e.g., number 300A). The mantissa 306*a* corresponds to the mantissa of the floating point number (e.g., number 300**A).

In some embodiments, number 300A corresponds to the first floating point number of method 200 or the second floating point number of method 200.

Other configurations in number 300A are within the scope of the present disclosure.

FIG. 3B is a diagram of a number 300B, in accordance with some embodiments.

Number 300B is an embodiment of at least a received signal of the set of received signals FP1 or FP2 of FIG. 1, and similar detailed description is therefore omitted.

In some embodiments, number 300B corresponds to the first floating point number of method 200 or the second floating point number of method 200.

Number 300B is a variation of number 300A, and similar detailed description is therefore omitted. For example, in comparison with number 300A of FIG. 3A, number 300B includes bits in the positions of the sign 302*a*, the exponent 304*a* and the mantissa 306*a*.

Number 300B includes the sign 302*a*, the exponent 304*a* and the mantissa 306*a*. Number 300B is a FLP16 format, and therefore includes 16 bits. The sign 302*a* includes 1 bit, the exponent 304*a* includes 5 bits, and the mantissa 306*a* includes 10 bits.

Other configurations or number of bits in number 300B are within the scope of the present disclosure.

FIG. 3C is a diagram of a number 300C, in accordance with some embodiments.

Number 300C is an embodiment of at least a signal of the set of signals INT1 or INT2 of FIG. 1, and similar detailed description is therefore omitted.

Number 300C is a normalized binary number. Number 300C includes a sign 302*c*, an integer part 304*c* and a fractional part 306*c*. The sign 302*c* corresponds to the sign of the integer (e.g., number 300C). The integer part 304*c* corresponds to the integer part of the integer (e.g., number 300C). The fractional part 306*c* corresponds to the fractional part of the integer (e.g., number 300C).

In some embodiments, number 300C is in normalized binary representation. In some embodiments, number 300C corresponds to the first binary number of method 200 or the second binary number of method 200.

Other configurations in number 300C or number formats for number 300C are within the scope of the present disclosure.

FIG. 3D is a diagram of a number 300D, in accordance with some embodiments.

Number 300D is an embodiment of at least a signal of the set of signals INT1 or INT2 of FIG. 1, and similar detailed description is therefore omitted.

Number 300D is a variation of number 300C, and similar detailed description is therefore omitted. For example, in comparison with number 300C of FIG. 3C, a binary point 308*c* of numbers 300C and 300D has been shifted in the x-direction (e.g., right) to position 308*d* thereby obtaining the equivalent integer value.

Number 300D is an integer. Number 300D includes a sign 302*d*, an integer part 304*d*1 and a fractional part 306*d*1. The sign 302*d* corresponds to the sign of the integer (e.g., number 300D). The integer part 304*d*1 corresponds to the integer part of the integer (e.g., number 300D). The fractional part 306*d*1 corresponds to the fractional part of the integer (e.g., number 300D).

In some embodiments, number 300D corresponds to the first integer of method 200 or the second integer of method 200. In some embodiments, number 300D corresponds to the quantized first binary format of method 200 or the quantized second binary format of method 200.

In some embodiments, number 300D corresponds to the first integer of method 200 or the second integer of method 200 after operations 202 and 206.

In some embodiments, number 300D is in an INT8 format or INT16 format.

Other configurations in number 300D or integer formats for number 300D are within the scope of the present disclosure.

Table

FIG. 3E is a diagram of a table 300E, in accordance with some embodiments.

Table 300E is a table of parameters of an integrated circuit, such as integrated circuit 100 of FIG. 1. For example, in some embodiments, the parameters in table 300E corresponds to one or more signals in the set of received signals FP1 or FP2, in the set of signals INT1, INT2 or INT3, or the set of output signals FP3.

Table 300E is generated by performance of one or more operations of method 200 of FIG. 2, and similar detailed description is omitted. In some embodiments, operation of one or more of integrated circuit 100, encoder circuit 400 of FIG. 4, encoder circuit 500 of FIG. 5, decoder circuit 600 of FIG. 6 or decoder circuit 800 of FIG. 8 results in a table similar to table 300E, and similar detailed description is omitted.

In some embodiments, method 200 is implemented by system 900 of FIG. 9, and system 900 is configured to at least generate or store table 300E, and similar detailed description is omitted. For example, in some embodiments, one or more of operations 202, 204, 206, 208 or 210 of method 200 generate or store a table similar to table 600 of FIG. 6. In some embodiments, table 600 is stored in memory 904 of FIG. 9. In some embodiments, table 600 is generated by system 900 of FIG. 9.

Table 300E comprises 4 rows and 5 columns. Column 1 comprises decimal values of a set of decimal numbers. Column 2 comprises a floating point (e.g., FP16) representation of the set of decimal numbers. Column 3 comprises shift bits utilized by at least quantizer 102, quantizer 104, method 200, encoder circuit 400 of FIG. 4 or encoder circuit 500 of FIG. 5 to convert the normalized binary representation in column 4 into the set of integers in column 5. Column 4 comprises a normalized binary representation of the set of decimal numbers. Column 5 comprises an integer representation of the normalized binary representation of the set of decimal numbers.

Each entry in column 1 has a corresponding entry in column 2, a corresponding entry in column 3, corresponding entry in column 4, a corresponding entry in column five and vice versa.

Other numbers of columns or rows in table 300E are within the scope of the present disclosure.

Column 3 comprises a set of shift bits 350. The set of shift bits 350 are determined according to the adjustment factor AF of formula 2 or 3 (shown below). In some embodiments, the set of shift bits 350 corresponds to the first number of shift bits of method 200 or the second number of shift bits of method 200. In some embodiments, the set of shift bits 350 includes shift bits signal SB1, shift bits signal IS1 or shift bits signal WS1.

In some embodiments, the adjustment factor AF of formula 2 or 3 (shown below) also depends on a maximum value for the exponents of the floating point numbers.

The maximum value for the exponents of the floating point numbers correspond to a maximum value adjustment Max_out. The maximum value adjustment Max_out is calculated according to formula 1, and is expressed as:

$$\text{MAX\_out} = \text{Exponent}_{max} - \text{Bias} \tag{1}$$

where $\text{Exponent}_{max}$ is the maximum exponent in the exponents of the floating point number, and Bias is the exponent bias.

In some embodiments, the exponent bias is 15 bits for FP16. Other floating point number types are within the scope of the present disclosure, and therefore other exponent bias values are also within the scope of the present disclosure.

In some embodiments, formula 1 is implemented by a maximum detector circuit 402 in decoder 400 of FIG. 4 or maximum detector circuit 502 in decoder 500 of FIG. 5.

The maximum value adjustment Max_out corresponds to a maximum value for the exponents of the floating point numbers. After the maximum value adjustment Max_out is determined, each of the floating point numbers (e.g., column 2) are mapped to a corresponding binary representation (e.g., column 4), and then the corresponding binary representation (e.g., column 4) is shifted based on the adjustment factor (e.g., column 3) to generate the corresponding integer representation (e.g., column 5).

For signed mode, the adjustment factor AF is calculated according to formula 2, and is expressed as:

$$AF=num\_\text{bits}-2-\text{max}+\text{exponent}(i) \quad (2)$$

where num_bits is the number of bits in the mantissa of the floating point number, max is defined in formula 1, and the exponent(i) is the exponent of the floating point number.

For unsigned mode, the adjustment factor AF is calculated according to formula 3, and is expressed as:

$$AF=num\_\text{bits}-1-\text{max}+\text{exponent}(i) \quad (3)$$

A first example of determining the integer (e.g., quantized output signal) from the floating point representation in accordance with operation 202, 204 and 206, quantizer 102 or quantizer 104, or encoder circuit 400 of FIG. 4 or encoder circuit 500 of FIG. 5 is described and corresponds to row 1 of table 300E.

If the maximum exponent of row 1 is 16, then the maximum exponent $\text{Exponent}_{max}$ is represented as 10000. A bias of 15 for FP16, is represented as 01111. Therefore, according to formula 1, the maximum value adjustment Max_out for row 1 is equal to: 10000-01111=00001. Thus, the maximum value adjustment Max_out for row 1 is equal to 00001 or 1.

The decimal value of row 1 corresponds to 0.25, and can also be represented in floating point FP16 format as being equal to: 0 01101 0000000000 (shown in row 1 & column 2 of table 300E).

The binary representation of 0.25 is equal to 0.01. However, normalized binary representation of 0.25 can be written as $1.0*2^{(-2)}$ and is equal to 01.000000 (shown in row 1 & column 4). Thus, the exponent value of decimal 0.25 is equal to −2 (e.g., exponent(i)=−2).

Assuming that integer 0.25 is signed, then applying the exponent value of −2 (e.g., exponent(i)=−2) to formula 2 with an 8 bit mantissa, results in: 8−2−1+(−2)=3. Thus, the adjustment factor AF for row 1 is equal to 3 bits. Therefore, when converting from binary representation to integer, the binary point for the entry in row 1 & column 4 (01.000000) is shifted to the right by 3 bits (01000.), and then 3 zero/0 bits are padded on the left side resulting in the entry in row 1 & column 5 (00001000). Accordingly, the FP16 representation of decimal 0.25 has been quantized, and corresponds to an integer or a quantized floating point output signal.

A second example of determining the integer (e.g., quantized output signal) from the floating point representation in accordance with operation 202, 204 and 206, quantizer 102 or quantizer 104, or encoder circuit 400 of FIG. 4 or encoder circuit 500 of FIG. 5 is described and corresponds to row 2 of table 300E.

For this example, the maximum value adjustment Max_out for row 2 is also equal to 00001 or 1.

The decimal value of row 2 corresponds to decimal −1.5, and can also be represented in floating point FP16 format as being equal to: 1 01111 1000000000 (shown in row 2 & column 2 of table 300E). However, decimal −1.5 is a negative number, and when formula 2 is applied to negative decimal numbers, the decimal number is initially considered as a positive number, before being converted to a corresponding negative number by a two's complement operation (s).

The binary representation of decimal 1.5 can be rewritten as 1.5*2 or 1.1000000 when normalized for a positive number. Thus, normalized binary representation of decimal 1.5 can be written as $1.5*2^{(0)}$ and is equal to 1.100000, but a leading 1 is added and corresponds to the sign for the negative value resulting in normalized 11.100000 (shown in row 2 & column 4). Thus, the exponent value of decimal 1.5 is equal to 0 (e.g., exponent(i)=0).

Assuming that integer 1.5 is signed, then applying the exponent value of 0 (e.g., exponent(i)=0) to formula 2 with an 8 bit mantissa, results in: 8−2−1+0=5. Thus, the adjustment factor AF for row 2 is equal to 5 bits. Therefore, when converting from binary representation to integer, the binary point for the positive entry in row 2 & column 4 (01.100000) is shifted to the right by 5 bits (0110000.), and then 1 zero/0 bits are padded on the left side resulting in 00110000.

However, since −1.5 is a negative number, the two's complement of number 00110000 is taken. For example, the number 00110000 is inverted to 11001111, and then is added to 1, resulting in 11010000, which is the entry in row 2 & column 5 (11010000). Accordingly, the FP16 representation of decimal as been quantized, and corresponds to an integer or a quantized floating point output signal.

A third example of determining the integer (e.g., quantized output signal) from the floating point representation in accordance with operation 202, 204 and 206, quantizer 102 or quantizer 104, or encoder circuit 400 of FIG. 4 or encoder circuit 500 of FIG. 5 is described and corresponds to row 2 of table 300E.

For this example, the maximum value adjustment Max_out for row 2 is also equal to 00001 or 1.

The decimal value of row 3 corresponds to decimal 3, and can also be represented in floating point FP16 format as being equal to: 0 10000 1000000000 (shown in row 3 & column 2 of table 300E).

The binary representation of decimal 3 can be rewritten as 1.5*2 or 1.1000000 when normalized. Thus, normalized binary representation of decimal 3 can be written as $1.5*2^{(1)}$ and is equal to 01.100000 (shown in row 3 & column 4). Thus, the exponent value of decimal 3 is equal to 1 (e.g., exponent(i)=1).

Assuming that integer 3 is signed, then applying the exponent value of 1 (e.g., exponent(i)=1) to formula 2 with an 8 bit mantissa, results in: 8−2−1+1=6. Thus, the adjustment factor AF for row 3 is equal to 6 bits. Therefore, when converting from binary representation to integer, the binary point for the entry in row 3 & column 4 (01.100000) is shifted to the right by 6 bits (01100000.) resulting in the entry in row 3 & column 5 (01100000). Accordingly, the FP16 representation of decimal 3 has been quantized, and corresponds to an integer or a quantized floating point output signal.

Other values in the entries of the rows or columns in table 300E are within the scope of the present disclosure.

FIG. 3F is a diagram 300F of a graphical illustration of at least part of operation 208 of method 200, in accordance with some embodiments.

Diagram 300F includes a number 310, number 312, a multiplier 320 and a number 314.

Multiplier 320 is configured to multiply number 310 by number 312 thereby resulting in number 314. In some embodiments, multiplier 320 corresponds to CIM array 106, and similar detailed description is therefore omitted.

Number 310 is an embodiment of at least a signal of the set of signals INT1 of FIG. 1, number 312 is an embodiment of at least a signal of the set of signals INT2 of FIG. 1, and number 314 is an embodiment of at least a signal of the set of signals INT3 of FIG. 1, and similar detailed description is therefore omitted.

At least number 310, 312 or 314 is a variation of number 300D, and similar detailed description is therefore omitted.

At least number 310, 312 or 314 is an integer.

Number 310 includes a sign **302*f*1, and an integer/fractional part 304*f*1. The sign 302*f*1 corresponds to the sign of the integer (e.g., number 310). The integer/fractional part 304*f*1 corresponds to the integer/fractional part of the integer (e.g., number 310**).

Number 312 includes a sign **302*f*2, and an integer/fractional part 304*f*2. The sign 302*f*2 corresponds to the sign of the integer (e.g., number 312). The integer/fractional part 304*f*2 corresponds to the integer/fractional part of the integer (e.g., number 312**).

Number 314 includes a sign **302*f*3, and an integer/fractional part 304*f*3. The sign 302*f*3 corresponds to the sign of the integer (e.g., number 314). The integer/fractional part 304*f*3 corresponds to the integer/fractional part of the integer (e.g., number 314**).

In some embodiments, number 310 corresponds to the first integer of method 200, and number 312 corresponds to the second integer of method 200. In some embodiments, number 314 corresponds to the third integer of method 200.

In some embodiments, at least number 310, 312 or 314 is in an INT8 format or INT16 format.

Other configurations in at least number 310, 312 or 314 or integer formats for at least number 310, 312 or 314 are within the scope of the present disclosure.

Other configurations in diagram 300F are within the scope of the present disclosure.

FIG. 3G is a diagram of a number 300G, in accordance with some embodiments.

Number 300G is an embodiment of at least a signal of the set of signals FP3 of FIG. 1, and similar detailed description is therefore omitted.

Number 300G is a variation of number 300A-300B or 314, and similar detailed description is therefore omitted. For example, in comparison with number 314 of FIG. 3F, number 300G has been converted to floating point.

Number 300G is a floating point number with base 2. Number 300G includes a sign **302*g*, an exponent 304*g* and a mantissa 306*g*. The sign 302*g* corresponds to the sign of the floating point number (e.g., number 300G). The exponent 304*g* corresponds to the exponent of the floating point number (e.g., number 300G). The mantissa 306*g* corresponds to the mantissa of the floating point number (e.g., number 300**G).

In some embodiments, number 300G corresponds to the third floating point number of method 200 and similar detailed description is therefore omitted. In some embodiments, number 300G corresponds to the third integer of method 200 or the second integer of method 200 after operation 210, and similar detailed description is therefore omitted. In some embodiments, number 300G is in an FP16 format.

Other configurations in number 300G or number formats for number 300G are within the scope of the present disclosure.

Encoder Circuit

FIG. 4 is a circuit diagram of an encoder circuit 400, in accordance with some embodiments.

Encoder circuit 400 is an embodiment of at least quantizer 102 or 104 of FIG. 1, and similar detailed description is therefore omitted. In some embodiments, operation of encoder circuit 400 results in a table similar to table 300E, and similar detailed description is omitted.

Encoder circuit 400 is configured to receive a set of signals FPin. In some embodiments, the set of signals FPin correspond to the set of received signals FP1 and FP2, and similar detailed description is therefore omitted. In some embodiments, the set of received signals FPin includes 64 FP words. Other number of words within the set of received signals FPin are within the scope of the present disclosure.

Encoder circuit 400 is configured to output a set of output signals OUT1. In some embodiments, the set of output signals OUT1 correspond to the set of output signals INT1 and INT2, and similar detailed description is therefore omitted. In some embodiments, the set of output signals OUT1 includes 64 FP words. Other number of words within the set of output signals OUT1 are within the scope of the present disclosure.

In some embodiments, each signal of the set of signals FPin includes a signed portion (not shown), an exponent portion (e.g., exponent signal EXP1) and a mantissa portion (e.g., mantissa signal MS1) of a FP16 number. Other configurations or formats for the set of signals FPin are within the scope of the present disclosure.

Encoder circuit 400 comprises a maximum detector circuit 402 coupled to a shifting circuit 404.

An input of the maximum detector circuit 402 is configured to receive the exponent portion (e.g., exponent signal EXP1) of each floating point number or signal.

The maximum detector circuit 402 is configured to detect a maximum value of a first portion (e.g., exponent portion) of a first signal (a signal of set of signals FPin). In some embodiments, the maximum detector circuit 402 is configured to determine the maximum value of each exponent in the set of signals FPin. For example, in some embodiments, the maximum detector circuit 402 is configured to determine the maximum value (e.g., maximum value adjustment signal MO) of 64 FP words. In some embodiments, the exponent portion (e.g., exponent signal EXP1) of each floating point number or signal is 5 bits in length. Other bit lengths for the exponent portion (e.g., exponent signal EXP1) of each floating point number or signal is within the scope of the present disclosure.

An output of the maximum detector circuit 402 is configured to output a maximum value adjustment signal MO. In some embodiments, the maximum value adjustment signal MO is a signal version of maximum value adjustment Max_out of Table 3E, and similar detailed description is omitted.

In some embodiments, the maximum value adjustment signal MO corresponds to the maximum value of each exponent in the set of signals FPin. In some embodiments, the maximum value adjustment signal MO corresponds to the maximum value of each exponent in 64FP words in the set of signals FPin.

The output of the maximum detector circuit 402 is coupled to an input of the shifting circuit 404. The shifting circuit 404 is configured to generate the set of output signals OUT1 in response to the maximum value of the first portion (e.g., exponent portion) of the first signal (a signal of set of signals FPin) and a second portion (e.g., mantissa portion) of the first signal.

In some embodiments, the first portion of the first signal corresponds to a first exponent of the first floating point number format, and the second portion of the first signal corresponds to a first mantissa of the first floating point number format, and a third portion of the first signal corresponds to a first sign bit of the first floating point number format.

Other configurations of the maximum detector circuit 402 are within the scope of the present disclosure.

An input of the shifting circuit 404 is configured to receive the maximum value of the first portion of the first signal and the second portion of the first signal. The shifting circuit 404 is configured to generate the set of output signals OUT1 in response to the maximum value of the first portion of the first signal and the second portion of the first signal. An output of the shifting circuit 404 is configured to output the set of output signals OUT1 in response to the maximum value of the first portion of the first signal and the second portion of the first signal.

The input of the shifting circuit 404 is configured to receive the maximum value adjustment signal MO and the mantissa portion (e.g., mantissa signal MS1) of each FP16 number.

The shifting circuit 404 is configured to generate a set of shift bits (e.g., shift bits signal SB1) in response to at least the maximum value adjustment signal MO and the mantissa portion (e.g., mantissa signal MS1) of each FP16 number. The shifting circuit 404 is configured to shift the mantissa portion (e.g., mantissa signal MS1) of each FP16 number by the set of shift bits (e.g., shift bits signal SB1) thereby generating the corresponding output signal of the set of output signals OUT1.

An output of the shifting circuit 404 is configured to output the set of shift bits (e.g., shift bits signal SB1) in response to at least the maximum value adjustment signal MO and the mantissa portion (e.g., mantissa signal MS1) of each FP16 number.

The output of the shifting circuit 404 is configured to output the set of output signals OUT1 in response to at least the maximum value adjustment signal MO and the mantissa portion (e.g., mantissa signal MS1) of each FP16 number.

Other configurations of the shifting circuit 404 are within the scope of the present disclosure.

Other configurations or number of elements in encoder circuit 400 are within the scope of the present disclosure.

In some embodiments, by using the encoder circuit 400 or 500 of the present disclosure, the quantization from floating point format to integer format performed by encoder circuit 400 or 500 is based on a scaling factor that is a multiple of 2. In some embodiments, by using a scaling factor that is a multiple of 2, shift operations can be employed which simplifies the quantization process from floating point format to integer format compared to other approaches.

FIG. 5 is a circuit diagram of an encoder circuit 500, in accordance with some embodiments.

Encoder circuit 500 is an embodiment of encoder circuit 400 of FIG. 4, and similar detailed description is therefore omitted. Encoder circuit 500 is an embodiment of at least quantizer 102 or 104 of FIG. 1, and similar detailed description is therefore omitted.

Encoder circuit 500 includes a maximum detector circuit 502 and a shifting circuit 504. The maximum detector circuit 502 is an embodiment of maximum detector circuit 402 of FIG. 4, and the shifting circuit 504 is an embodiment of shifting circuit 404 of FIG. 4, and similar detailed description is omitted.

The maximum detector circuit 502 comprises a set of comparators 510 and a register 512.

The set of comparators 510 is configured to compare each bit of the first portion of the first signal thereby generating the maximum value of the first portion of the first signal. In some embodiments, the set of comparators 510 is configured to compare each bit of the exponent portion (e.g., exponent signal EXP1) of each floating point number or signal thereby generating the maximum value adjustment signal MO1. In some embodiments, the maximum value adjustment signal MO1 is the maximum value adjustment signal MO of FIG. 4, and similar detailed description is therefore omitted. In some embodiments, the maximum value adjustment signal MO1 is the maximum value of each exponent in the set of signals FPin.

The set of comparators 510 includes 3 stages of comparators. The first stage of comparators is configured to compare the exponent portion (e.g., exponent signal EXP1) of each floating point number or signal thereby generating a first set of comparison signals (not labelled).

The second stage of comparators is configured to receive the first set of comparison signals (not labelled) from the first stage of comparators, compare the first set of comparison signals (not labelled) thereby generating a second set of comparison signals (not labeled).

The third stage of comparators is configured to receive the second set of comparison signals (not labelled) from the second stage of comparators, compare the second set of comparison signals (not labelled) thereby generating a third set of comparison signals (e.g., signal MO1).

The set of comparators 510 has 8 inputs for FP16 numbers. Thus, in order to process 16 bits of data, the 16 bits of data are split into 2 groups of 8 bits by the set of comparators 510, and each group of 8 bits is processed by the set of comparators 510 separately.

Other number of stages for the set of comparators 510 are within the scope of the present disclosure. For example, in some embodiments, the set of comparators 510 has 16 inputs, and the 16 bits of data are not split into 2 groups, and are simultaneously processed by the set of comparators 510.

Other configurations for the set of comparators 510 are within the scope of the present disclosure.

The register 512 is coupled to the set of comparators 510, and is configured to store the maximum value adjustment signal MO1. In some embodiments, the register 512 is configured to store the first set of comparison signals (not labelled), the second set of comparison signals (not labelled) or the third set of comparison signals (not labelled) as the maximum value adjustment signal MO1.

Other configurations for the register 512 are within the scope of the present disclosure.

The shifting circuit 504 comprises an adder/subtractor circuit 520 and a shift register 522.

The adder/subtractor circuit 520 is coupled to the register 512, and is configured to generate a first adjustment signal in response to the maximum value of the first portion of the first signal and the first portion of the first signal. In some embodiments, the adder/subtractor circuit 520 is configured to generate a set of shift bits (e.g., shift bits signal SB1) in response to at least the maximum value adjustment signal MO and the mantissa portion (e.g., mantissa signal MS1) of each FP16 number. In some embodiments, the set of shift bits (e.g., shift bits signal SB1) is determined according to at least formula 2 or 3.

Other configurations for the adder/subtractor circuit 520 are within the scope of the present disclosure.

The shift register 522 is coupled to the adder/subtractor circuit 520, and is configured to generate the first signal in response to the first adjustment signal and the second portion of the first signal. In some embodiments, the shift register 522 is configured to shift the mantissa portion (e.g., mantissa signal MS1) of each FP16 number by the set of shift bits (e.g., shift bits signal SB1) thereby generating the corresponding output signal of the set of output signals OUT1.

In some embodiments, the first mantissa of the first floating point number format that corresponds to the second portion of the first signal is shifted by the first adjustment signal in a first direction. In some embodiments, the mantissa portion (e.g., mantissa signal MS1) of each FP16 number is shifted by the set of shift bits (e.g., shift bits signal SB1) in a first direction (x-direction or to the right).

Other configurations for the shift register circuit 522 are within the scope of the present disclosure.

Other configurations or number of elements in encoder circuit 500 are within the scope of the present disclosure.

Decoder Circuit

Figure 6:
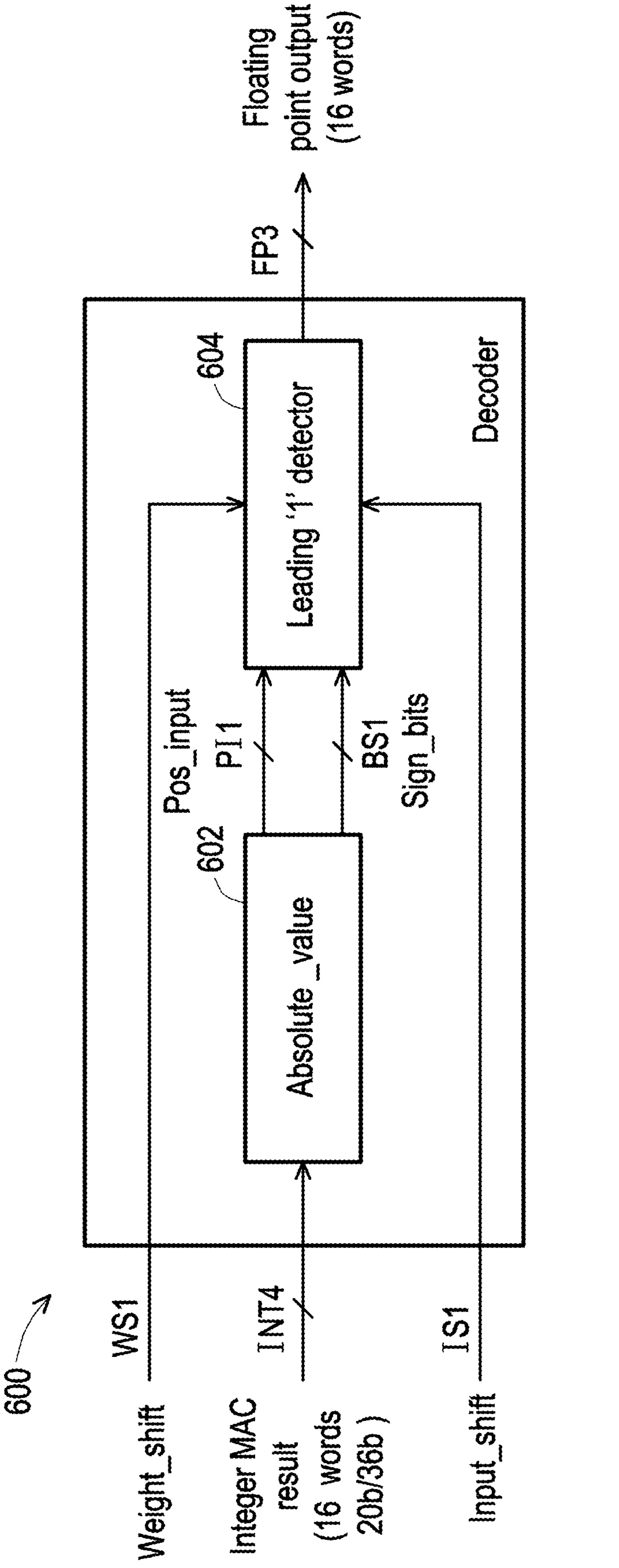
FIG. 6 is a circuit diagram of a decoder circuit, in accordance with some embodiments.

FIG. 6 is a circuit diagram of a decoder circuit 600, in accordance with some embodiments.

Decoder circuit 600 is an embodiment of at least dequantizer 108 of FIG. 1, and similar detailed description is therefore omitted.

Decoder circuit 600 is configured to receive the set of signals INT4. In some embodiments, the set of signals INT4 correspond to the set of signals INT3, and similar detailed description is therefore omitted. In some embodiments, the set of signals INT4 includes 16 FP words. In some embodiments, each FP word of the 16 FP words includes 20 bits. In some embodiments, each FP word of the 16 FP words includes 36 bits. Other number of bits for each FP word are within the scope of the present disclosure. Other number of words within the set of signals IN4 are within the scope of the present disclosure.

Decoder circuit 600 is configured to output the set of signals FP3. In some embodiments, the set of signals FP3 includes 16 FP words. Other number of words within the set of signals FP3 are within the scope of the present disclosure.

In some embodiments, each signal of the set of signals FP3 includes a signed portion (e.g., sign portion **302*f*3 in FIG. 3F), and an integer/fractional (e.g., sign portion 304*f*3 in FIG. 3**F) of an integer number. Other configurations or formats for the set of signals FP3 are within the scope of the present disclosure.

Decoder circuit 600 comprises an absolute value detector circuit 602 coupled to a detector circuit 604.

An input of the absolute value detector circuit 602 is configured to receive the signed portion (e.g., exponent signal EXP1) of each integer or signal.

The absolute value detector circuit 602 is configured to generate a set of positive signals PI1 and a set of sign bits BS1 in response to the set of signals INT4. In some embodiments, the set of positive signals PI1 is an absolute value of the set of signals INT4. In some embodiments, the set of sign bits BS1 is the sign of the set of signals INT4.

The absolute value detector circuit 602 is configured to detect a set of absolute values of the set of signals INT4. In some embodiments, the absolute value detector circuit 602 is configured to detect an absolute value of each signal of the set of signals INT4.

In some embodiments, the absolute value detector circuit 602 is configured to generate a positive signal of the set of positive signals PH and a corresponding sign bit of the set of sign bits BS 1 in response to a corresponding signal of the set of signals INT4. In some embodiments, each positive signal of the set of positive signals PI1 is an absolute value of a corresponding signal of the set of signals IN4T, and the corresponding sign bit of the set of sign bits BS1 is a corresponding sign of the set of signals INT4 or the corresponding positive signal of the set of positive signals PI1.

An output of the absolute value detector circuit 602 is configured to output the set of positive signals PI1 and the set of sign bits BS1.

Other configurations for the absolute value detector circuit 602 are within the scope of the present disclosure.

An input of the detector circuit 604 is coupled to at least the output of the absolute value detector circuit 602. In some embodiments, the input of the detector circuit 604 is coupled to the output of the absolute value detector circuit 602, the output of quantizer 102 and the output of quantizer 104.

The input of the detector circuit 604 is configured to receive the set of positive signals PH and the set of sign bits BS1 from the absolute value detector circuit 602, and is configured to receive a set of shift bits signal (e.g., shift bits signal WS1) and a set of shift bits signal (e.g., shift bits signal IS1). In some embodiments, the detector circuit 604 is configured to receive the set of shift bits signal (e.g., shift bits signal WS1) from quantizer 104. In some embodiments, the detector circuit 604 is configured to receive the set of shift bits signal (e.g., shift bits signal IS1) from quantizer 102.

An output of the detector circuit 604 is configured to output the set of output signals FP3 in response to the set of positive signals PI1, the set of sign bits BS1, the set of shift bits signal (e.g., shift bits signal WS1) and the set of shift bits signal (e.g., shift bits signal IS1).

In some embodiments, the detector circuit 604 is referred to as leading "1" detector circuit, and the detector circuit 604 is configured to determine or locate a leading "1" position within each signal of the set of signals INT4 as shown in FIG. 7. In some embodiments, based on the leading "1" position within each signal of the set of signals INT4, the detector circuit 604 is configured to determine an exponent EXP2 (FIG. 7) of the corresponding output signal of the set of output signals FP3, and a corresponding number of shift bits of the set of shift bits (e.g., WS1 and IS1) thereby generating a corresponding mantissa MS2 (FIG. 7) of the corresponding output signal of the set of output signals FP3.

The detector circuit 604 is configured to generate the set of output signals FP3 in response to the set of positive signals PI1, the set of sign bits BS1, the set of shift bits signal (e.g., shift bits signal WS1) and the set of shift bits signal (e.g., shift bits signal IS1). In some embodiments, the detector circuit 604 is configured to generate an output signal of the set of output signals FP3 in response to a positive signal of the set of positive signals PI1, a sign bit of the set of sign bits BS1, a shift bits signal of the set of shift bits signal (e.g., shift bits signal WS1) and a shift bits signal of the set of shift bits signal (e.g., shift bits signal IS1).

The detector circuit 604 is configured to generate a first output signal of the set of first output signals (e.g., FP3) in response to a positive signal of the set of positive signals (e.g., PI1), a first adjustment signal of a set of first adjustment signals (e.g., IS1 or WS1) and a second adjustment signal of a set of second adjustment signals (e.g., WS1 or IS1).

In some embodiments, the first output signal includes a first portion of the first output signal, a second portion of the first output signal, a third portion of the first output signal and a fourth portion of the first output signal. In some embodiments, the first output signal includes a signal of the set of output signals FP3.

In some embodiments, the first portion of the first output signal corresponds to a second exponent (e.g., EXP2 in FIGS. 7-8) of the second floating point number format. In some embodiments, the second portion of the first output signal corresponds to a first portion (e.g., shifted portion SP in FIG. 8) of the second mantissa (e.g., MS2 in FIGS. 7-8) of the second floating point number format. In some embodiments, the third portion of the first output signal corresponds to a second sign bit (e.g., BS1 in FIGS. 7-8) of the second floating point number format. In some embodiments, the fourth portion of the first output signal corresponds to a zero padded portion (e.g., signal ZP in FIGS. 7-8) of a second portion of the second mantissa.

Other configurations for the detector circuit 604 are within the scope of the present disclosure.

Other configurations or number of elements in decoder circuit 600 are within the scope of the present disclosure.

In some embodiments, by using the decoder circuit 600 or 800 of the present disclosure, the de-quantization from integer format to floating point format performed by decoder circuit 600 or 800 is based on a scaling factor that is a multiple of 2. In some embodiments, by using a scaling factor that is a multiple of 2, shift operations can be employed which simplifies the de-quantization process from integer format to integer format compared to other approaches.

FIG. 7 is a diagram 700 of a graphical illustration of at least part of operation 210 of method 200, in accordance with some embodiments.

Diagram 700 includes number 700A, diagram 700B and number 700C.

Number 700A corresponds to a signal of the set of signals INT3 after operation 208 of method 200, in accordance with some embodiments.

Diagram 700B corresponds to a graphical illustration of determining the set of exponent signals EXP2 according to formula 4 (described below), in accordance with some embodiments.

Number 700C corresponds to a signal of the set of output signals FP3 after operation 210 of method 200, in accordance with some embodiments.

Number 700A is an embodiment of at least a signal of the set of signals INT1 of FIG. 1, and similar detailed description is therefore omitted.

Number 700A is a variation of number *306f3* of FIG. 3F, and similar detailed description is therefore omitted. In some embodiments, number 700A corresponds to the third integer of method 200.

Number 700A includes a sign 702, and an integer/fractional part 704. The sign 702 corresponds to the sign of the integer (e.g., number 700A). The integer/fractional part 704 corresponds to the integer/fractional part of the integer (e.g., number 700A).

The integer/fractional part 704 of number 700A includes a leading one position **704*a* at the $8^{th}$ bit from a first end 706. In some embodiments, the leading one position 704*a* is a position of a 1 bit in number 700A. The integer/fractional part 704 of number 700A further includes mantissa portion 704*b*. The mantissa portion 704*b* is directly next to the leading one position 704*b*. Number has a second end 710. The mantissa portion 704*b* is a portion of the mantissa 750 of number 700**C.

In some embodiments, a leading one detector circuit (e.g., the set of multiplexers 822 and the set of AND logic gates 824) is configured to locate the leading one position **704*a* in number 700A, and thereby generates a set of position signals LIP (described below in FIG. 8**).

Other configurations in number 700A or formats for number 700A are within the scope of the present disclosure.

Diagram 700B corresponds to a graphical illustration of determining an exponent of the set of exponent signals EXP2 according to formula 4 (described below), in accordance with some embodiments.

In some embodiments, the set of exponent signals EXP2 is the corresponding exponent portion of the corresponding output signal of the set of output signals FP3 when converted by decoder 600 or 800 to floating point format. In some embodiments, the set of exponent signals EXP2 is determined according to at least formula 4, and is expressed as:

$$EXP2=\text{leading 1 position}-(IS1+WS1)+BIAS \quad (4)$$

For example, in number 700A, the leading one position **704*a* is at the eighth position from the first end 706 of number 700**A. In this non-limiting example, if the number of weight shifted bits (e.g., signal WS1) is equal to 5, and the number of input shifted bits (e.g., signal IS1) is equal to 7, and if the bias BIAS is equal to 15, then formula 4 results in the exponent signal EXP2 having a value equal to 11.

In some embodiments, the adder/subtractor circuit 830 is configured to determine the set of exponent signals EXP2 in accordance with formula 4. For example, in some embodiments, the adder/subtractor circuit 830 is configured to generate a set of exponent signals EXP2 in response to the set of shift bits signal IS1, the set of shift bits signal WS1, the set of position signals LIP and the bias signal BIAS.

In some embodiments, each signal of the set of exponent signals EXP2 is a corresponding exponent portion of the floating point number of the set of output signals FP3.

Number 700C corresponds to a signal of the set of output signals FP3 after operation 210 of method 200, in accordance with some embodiments.

Number 700C is an embodiment of at least a signal of the set of output signals FP3 of FIG. 1, and similar detailed description is therefore omitted.

Number 700C is a variation of number 300G of FIG. 3G, and similar detailed description is therefore omitted. In some embodiments, number 700C corresponds to the third floating point number of method 200.

Number 700C includes sign 702, an exponent 720 and a mantissa 750.

The exponent 720 corresponds to a binary number of the exponent signal EXP2 as determined according to formula 4. For example, in the non-limiting example described above where the exponent EXP has a value equal to 11, the binary number of 11 corresponds to 01011. Thus, the exponent 720 has a value of 01011.

The mantissa 750 is determined by shifting the mantissa portion **704*b* of number 700A by 2 bits to the left with respect to the second end 710 of number 700A, and then padding 2 zeros in zero pad portion 740 of number 700C. In some embodiments, the number of padded zeros ZP in zero pad portion 740** is equal to the number of shifted bits for a shift bits signal BS2.

In some embodiments, the number of shifted bits of 2 bits in FIG. 7 is equal to a shift bits signal BS2 (described in FIG. 8). The shift bits signal BS2 is equal to a difference between a number of shifted bits in the set of shift bits signal IS1 and a number of shifted bits in the set of shift bits signal WS1, and is determined according to at least formula 5 (described below in FIG. 8).

In the non-limiting example of FIG. 7, the number of weight shifted bits (e.g., signal WS1) is equal to 5, and the number of input shifted bits (e.g., signal IS1) is equal to 7, thus the shift bits signal BS2 is equal to 7-5 which is equal to 2 bits.

In some embodiments, the mantissa 750 is determined by operation of shift register 834 and register 840 in FIG. 8.

Other configurations in number 700C or formats for number 700C are within the scope of the present disclosure.

Other configurations in diagram 700 are within the scope of the present disclosure.

Decoder Circuit

FIG. 8 is a circuit diagram of a decoder circuit 800, in accordance with some embodiments.

Decoder circuit 800 is an embodiment of decoder circuit 600 of FIG. 6, and similar detailed description is therefore omitted. Decoder circuit 800 is an embodiment of at least de-quantizer 108 of FIG. 1, and similar detailed description is therefore omitted.

Decoder circuit 800 comprises an absolute value detector circuit 802 coupled to a detector circuit 804. The absolute value detector circuit 802 is an embodiment of absolute value detector circuit 602 of FIG. 6, and the detector circuit 804 is an embodiment of detector circuit 604 of FIG. 6, and similar detailed description is omitted.

The absolute value detector circuit 802 comprises a comparator 810, a set of inverters 812 and a reversible adder circuit 814.

The comparator 810 is configured to generate a set of enable signals EN in response to a set of signals INT4 and a reference signal REF. In some embodiments, the comparator 810 is configured to generate an enable signal of the set of enable signals EN in response to at least a signal of the set of signals INT4 and the reference signal REF.

An output of comparator 810 is configured to output the set of enable signals EN. The output of comparator 810 is coupled to an input of the reversible adder circuit 814.

The comparator 810 is configured to compare the set of signals INT4 with the reference signal REF, thereby generating corresponding output signals (e.g., the set of enable signal EN). In some embodiments, comparator 810 is configured to compare the most significant bit in the set of signals INT4, with the reference signal REF. For example, in some embodiments, the reference signal REF is a logic 0, and the comparator is configured to generate a logic 1 as the corresponding enable signal EN, if the most significant bit in the set of signals INT4 is greater than the reference signal REF. In some embodiments, if the most significant bit in the set of signals INT4 is greater than the reference signal REF, then the corresponding signal is a negative number.

For example, in some embodiments, the reference signal REF is a logic 0, and the comparator is configured to generate a logic 0 as the corresponding enable signal EN, if the most significant bit in the set of signals INT4 is not greater than the reference signal REF. In some embodiments, if the most significant bit in the set of signals INT4 is not greater than the reference signal REF, then the corresponding signal is a positive number.

Other values for the reference signal REF are within the scope of the present disclosure. For example, in some embodiments, reference signal REF has a value of logic 1, and the output of comparator 810 is inverted from the output of comparator 810 when the reference signal REF has a value of logic 0.

Other configurations for the comparator 810 are within the scope of the present disclosure.

The set of inverters 812 is configured to receive the set of signals INT4, and is configured to generate an inverted set of signals INT4B.

The set of inverters 812 includes at least inverter 812*a*, 812*b*, 812*c* or 812*d*. Other number of inverters in the set of inverters 812 are within the scope of the present disclosure, and are consistent with a number of bits in the corresponding signal of the set of signals INT4.

Each inverter of the set of inverters 812 is configured to output an inverted signal of the set of inverted signals INT4B in response to the signal of the set of signals INT4.

An output of the set of inverters 812 is coupled to an input of the reversible adder circuit 814.

Other configurations for the set of inverters 812 are within the scope of the present disclosure.

The reversible adder circuit 814 is coupled to the comparator 810 and the set of inverters 812.

The reversible adder circuit 814 is configured to generate a set of positive signals PI1 in response to at least the set of enable signals EN and at least the set of signals INT4 or the set of inverted signals inverted INT4B. In some embodiments, the reversible adder circuit 814 is further configured to generate the set of sign bits BS1 in response to at least the set of enable signals EN the set of signals INT4 or the set of inverted signals inverted INT4B. In some embodiments, an output of the reversible adder circuit 814 is coupled to register 840 to output the set of sign bits BS1 to the register 840.

In some embodiments, the set of enable signals EN is configured to enable or disable the reversible adder circuit 814. For example, in some embodiments, if a signal of the set of signals INT4 is a negative number, then the corresponding enable signal of the set of enable signals EN is a logic 1, and the reversible adder circuit 814 is enabled. In some embodiments, if the reversible adder circuit 814 is enabled, then the reversible adder circuit 814 is configured to add a logic "1" to the set of inverted signals INT4B thereby determining the two's complement of the set of signals INT4. In these embodiments, the two's complement of the set of signals INT4 corresponds to the set of positive signals PI1. Stated differently, if the reversible adder circuit 814 is enabled, then the reversible adder circuit 814 is configured to output the two's complement of the set of signals INT4 as the set of positive signals PI1.

For example, in some embodiments, if a signal of the set of signals INT4 is already a positive number, then the corresponding enable signal of the set of enable signals EN is a logic 0, and the reversible adder circuit 814 is not enabled. In some embodiments, if the reversible adder circuit 814 is not enabled, then the reversible adder circuit 814 is configured to output the set of signals INT4 as the set of positive signals PI1.

An output of the reversible adder circuit 814 is coupled to inputs of a set of multiplexers 822 and an input of shift register 834 to output the set of positive signals PI1 to the set of multiplexers 822 and the shift register 834.

Other configurations for the reversible adder circuit 814 are within the scope of the present disclosure.

The detector circuit comprises the set of multiplexers 822, a set of AND logic gates 824, an adder/subtractor circuit 830, an adder/subtractor circuit 832, the shift register 834 and the register 840.

The set of multiplexers 822 is coupled to the reversible adder circuit 814. The set of multiplexers 822 is configured to generate a set of position signals PI2 in response to the set of positive signals PI1. In some embodiments, the set of multiplexers 822 is configured to locate an index or position within the set of positive signals PI1 thereby generating the set of position signals PI2. In some embodiments, the set of position signals PI2 includes at least position signal PI2a, PI2b, PI2c or PI2d.

In some embodiments, the set of position signals PI2 identify at least a position of a first value in the set of positive signals PI1 or positions of a second value in the set of positive signals PI1. In some embodiments, the second value is a logic 0, and the first value is a logic 1. In some embodiments, the second value is inverted from the first value. Other values are within the scope of the present disclosure.

The set of multiplexers 822 includes multiplexers 822*a*, 822*b* or 822*c*. Each multiplexer of the set of multiplexers 822 is configured to receive a corresponding signal a3, a2, a1 of the set of positive signals PI1. Each multiplexer of the set of multiplexers 822 is configured to output a corresponding position signal PI2a, PI2b or PI2c of the set of position signals PI2 in response to a corresponding signal a3, a2, a1 of the set of positive signals PI1. In some embodiments, the set of position signals PI2 includes at least position signal d3, PI2a, PI2b or PI2c. In some embodiments, signals a3 corresponds to position signal d3.

In some embodiments, the corresponding signal a3, a2, a1 of the set of positive signals PI1 are corresponding select signals that cause the corresponding multiplexer of the set of multiplexers 822 to output a logic 1 or logic 0.

In some embodiments, if signal a3 of the set of positive signals PH is a logic 1, then multiplexer 822*a* of the set of multiplexers 822 is configured to output a logic 0, and thus multiplexer 822*a* of the set of multiplexers 822 has located an index or position within the set of positive signals PH of a leading 1. In some embodiments, if signal a3 of the set of positive signals PI1 is a logic 0, then multiplexer 822*a* of the set of multiplexers 822 is configured to output a logic 1, and thus multiplexer 822*a* of the set of multiplexers 822 has not located an index or position within the set of positive signals PI1 of a leading 1.

Multiplexer 822*b* has an input that is coupled to ground VSS, and another input coupled to the output of multiplexer 822*a*. Multiplexer 822*c* has an input that is coupled to ground VSS, and another input coupled to the output of multiplexer 822*b*.

In some embodiments, once a multiplexer of the set of multiplexers 822 receives a logic 1 on the corresponding select input terminal, then the corresponding multiplexer of the set of multiplexers 822 has detected or identified a leading 1 position, and the remaining multiplexers of the set of multiplexers 822 are configured to output a corresponding logic 0.

In some embodiments, if the corresponding signal a2 of the set of positive signals PI1 is a logic 0, then the corresponding multiplexer 822*b* is configured to output the signal received from the output of multiplexer 822*a*. In some embodiments, if the corresponding signal a2 of the set of positive signals PI1 is a logic 1, then the corresponding multiplexer 822*b* is configured to output a logic 0 as the output signal.

In some embodiments, if the corresponding signal a1 of the set of positive signals PI1 is a logic 0, then the corresponding multiplexer 822*c* is configured to output the signal received from the output of multiplexer 822*b*. In some embodiments, if the corresponding signal a1 of the set of positive signals PI1 is a logic 1, then the corresponding multiplexer 822*c* is configured to output a logic 0 as the output signal.

Other configurations for the set of multiplexers 822 are within the scope of the present disclosure.

The set of AND logic gates 824 is coupled to the set of multiplexers 822 and the adder/subtractor circuit 830.

The set of AND logic gates 824 is configured to generate the set of position signals LIP in response to at least the set of position signals PI2 or the set of positive signals PI1. In some embodiments, the set of position signals LIP includes at least position signal d3, d2, d1 or d0.

The set of AND logic gates 824 includes AND logic gates 824*a*, 824*b* or 824*c*. Each AND logic gate of the set of AND logic gates 824 is configured to receive a corresponding signal a2, a1, a0 of the set of positive signals PH and a corresponding signal PI2a, PI2b, PI2c of the set of position signals PI2.

Each AND logic gate of the set of AND logic gates 824 is configured to output a corresponding position signal d2, d1, d0 of the set of position signals LIP in response to a corresponding signal a2, a1, a0 of the set of positive signals PH and a corresponding signal PI2a, PI2b, PI2c of the set of position signals PI2.

In some embodiments, in conjunction with the set of multiplexers 822, the set of AND logic gates 824 is configured to locate a leading 1 position within the set of positive signals PI1, thereby generating the set of position signals LIP.

In some embodiments, once an AND logic gate of the set of AND logic gates 824 outputs a logic 1 on the corresponding output terminal (that also corresponds to a leading 1 position) of the corresponding signal of the set of positive signal PI1, then the remaining AND logic gates of the set of AND logic gates 824 output a logic 0 on the corresponding output terminal of the remaining AND logic gates of the set of AND logic gates 824.

In some embodiments, if the signal a3 is a logic 1 (that also corresponds to a leading 1 position), then each of the AND logic gates of the set of AND logic gates 824 output a logic 0.

Other configurations for the set of AND logic gates 824 are within the scope of the present disclosure.

An input of the adder/subtractor circuit 830 is coupled to the set of AND logic gates 824, the reversible adder circuit 814, the quantizer 102 and the quantizer 104. An output of the adder/subtractor circuit 830 is coupled to the register 840.

The adder/subtractor circuit 830 is configured to generate a set of exponent signals EXP2 in response to the set of shift bits signal IS1, the set of shift bits signal WS1, the set of position signals LIP and the bias signal BIAS. In some embodiments, each signal of the set of exponent signals EXP2 is a corresponding exponent portion of the floating point number of the set of output signals FP3. In some embodiments, the set of exponent signals EXP2 is determined according to at least formula 4 in FIG. 7.

In some embodiments, the third adder/subtractor circuit (e.g., 830) is configured to generate a first exponent signal (e.g., EXP2) in response to the first adjustment signal (e.g., IS1 or WS1), the second adjustment signal (WS1 or IS1), a first position signal (e.g., LIP) and a bias signal (e.g., BIAS). In some embodiments, the first exponent signal corresponds to the second exponent of the second floating point number format.

An output of the adder/subtractor circuit 830 is configured to output the set of exponent signals EXP2 to the register 840.

Other configurations for the adder/subtractor circuit 830 are within the scope of the present disclosure.

An input of the adder/subtractor circuit 832 is coupled to the output of quantizer 102 and to the output of quantizer 104. An output of the adder/subtractor circuit 832 is coupled to the shift register 834.

The adder/subtractor circuit 832 is configured to generate a set of shift bits signal BS2 in response to the set of shift bits signal IS1 and the set of shift bits signal WS1. In some embodiments, each signal of the set of shift bits signals BS2 is a number of bits that the shift register 834 is shifted in the second direction (e.g., negative x-direction) or to the left when generating the corresponding shifted signal of the set of shifted signals SPI1.

In some embodiments, a number of shifted bits for at least a shift bits signal of the set of shift bits signals BS2 is equal to a difference between a number of shifted bits in the set of shift bits signal IS1 and a number of shifted bits in the set of shift bits signal WS1, and is determined according to at least formula 5, and is expressed as:

$$BS2=IS1-WS1 \quad (5)$$

In some embodiments, the number of padded zeros ZP (shown in FIG. 7) is equal to the number of shifted bits for at least a shift bits signal of the set of shift bits signals BS2.

In some embodiments, the adder/subtractor circuit 832 is configured to generate a third adjustment signal (e.g., BS2) in response to the first adjustment signal (e.g., IS1 or WS1) and the second adjustment signal (e.g., WS1 or IS1).

An output of the adder/subtractor circuit 832 is configured to output the set of shift bits signal BS2 to the register 840.

Other configurations for the adder/subtractor circuit 832 are within the scope of the present disclosure.

An input of the shift register 834 is coupled to an output of adder/subtractor circuit 832 and an output of reversible adder circuit 814. An output of the shift register 834 is coupled to an input of the register 840.

The shift register 834 is coupled to the adder/subtractor circuit 832 and reversible adder circuit 814, and is configured to generate the set of shifted signals SPI1 in response to the set of shifted bits signals BS2 and the set of positive signals PI1.

In some embodiments, the shift register 834 is configured to shift each signal of the set of positive signals PI1 by a corresponding number of bits of the set of the set of shift bits signals BS2 in the second direction (e.g., negative x-direction) or to the left thereby generating the corresponding shifted signal of the set of shifted signals SPI1.

In some embodiments, the shift register 834 is configured to generate the second portion of the output signal (e.g., shifted portion signal SPI1) in response to the third adjustment signal (e.g., BS2) and the positive signal (e.g., PI1). In some embodiments, the second mantissa of the second floating point number format that corresponds to the shifted portion of the output signal that is shifted by the third adjustment signal in the second direction opposite from the first direction. In some embodiments, the shifted portion (e.g., SP in FIG. 7) of the mantissa (e.g., mantissa signal MS2) of each FP16 number is shifted by the set of shift bits (e.g., set of shift bits signal BS2) in the second direction (x-direction or to the left).

Other configurations for the shift register circuit 834 are within the scope of the present disclosure.

An input of register 840 is coupled to an output of the adder/subtractor circuit 830, an output of the adder/subtractor circuit 832, and an output of the reversible adder circuit 814.

The register 840 is coupled to the adder/subtractor circuit 830, the adder/subtractor circuit 832 and the reversible adder circuit 814. The register 840 is configured to receive and store the set of exponent signals EXP2, the set of shifted signals SPI1, the padded zeros signal (e.g., number of padded zeros ZP).

The register 840 is configured to generate the set of output signals FP3 in response to the set of exponent signals EXP2, the set of shifted signals SPI1, the padded zeros signal (e.g., number of padded zeros ZP). In some embodiments, the register 840 is configured to assemble the set of output signals by concatenating the set of exponent signals EXP2, the set of shifted signals SPI1, the padded zeros signal (e.g., number of padded zeros ZP).

In some embodiments, the register 840 is configured to receive a padded zeros signal that corresponds to a number of zeros ZP that are padded at an end 710 (FIG. 7) of the set of output signals FP3 to account for the number of bits shifted by the shift register In some embodiments, the register 840 receives the padded zeros signal (e.g., number of padded zeros ZP) from a circuit (not shown). In some embodiments, the register 840 receives the set of shift bits signals BS2, and generates the padded zeros signal (e.g., number of padded zeros ZP) based on a number of shift bits in the set of shift bits signals BS2.

An output of register 840 is configured to output the set of output signals FP3.

In some embodiments, register 840 is configured to store the first portion of the output signal (e.g., EXP2), the second portion of the output signal (e.g., SPI1), the third portion of the output signal (e.g., BS1) and the fourth portion of the output signal (e.g., ZP), and to output the output signal (e.g., FP3).

Other configurations for the register 840 are within the scope of the present disclosure.

Other configurations or number of elements in decoder circuit 800 are within the scope of the present disclosure.

System

FIG. 9 is a schematic view of a system 900, in accordance with some embodiments. In some embodiments, system 900 is an embodiment of at least integrated circuit 100, and similar detailed description is therefore omitted.

In some embodiments, system 900 is an embodiment of at least quantizer 102 or 104, CIM array 106, de-quantizer 108, encoder 400, encoder 500, decoder 600 or decoder 800, and similar detailed description is therefore omitted.

In some embodiments, system 900 is configured to perform one or more operations of method 200.

System 900 includes a hardware processor 902 and a non-transitory, computer readable storage medium 904 (e.g., memory 904) encoded with, i.e., storing, the computer program code 906, i.e., a set of executable instructions 906.

Computer readable storage medium 904 is configured for interfacing with at least quantizer 102 or 104, CIM array 106, de-quantizer 108, encoder 400, encoder 500, decoder 600 or decoder 800.

The processor 902 is electrically coupled to the computer readable storage medium 904 by a bus 908. The processor 902 is also electrically coupled to an I/O interface 910 by bus 908. A network interface 912 is also electrically connected to the processor 902 by bus 908. Network interface 912 is connected to a network 914, so that processor 902 and computer readable storage medium 904 are capable of connecting to external elements by network 914. The processor 902 is configured to execute the computer program code 906 encoded in the computer readable storage medium 904 in order to cause system 900 to be usable for performing a portion or all of the operations as described in at least method 200. In some embodiments, network 914 is not part of system 900.

In some embodiments, the processor 902 is a central processing unit (CPU), a multi-processor, a distributed processing read circuit, an application specific integrated circuit (ASIC), and/or a suitable processing unit.

In some embodiments, the computer readable storage medium 904 is an electronic, magnetic, optical, electromagnetic, infrared, and/or a semiconductor read circuit (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform one or more operations of at least method 200. In some embodiments, the storage medium 904 also stores information used for performing at least method 200 as well as information generated during performing at least method 200, such as table 916, set of signals 918, shift bits 920, and user interface 928, and/or a set of executable instructions to perform one or more operations of at least method 200.

In some embodiments, the storage medium 904 stores instructions (e.g., computer program code 906) for interfacing with at least quantizer 102 or 104, CIM array 106, de-quantizer 108, encoder 400, encoder 500, decoder 600 or decoder 800. The instructions (e.g., computer program code 906) enable processor 902 to generate instructions readable by at least quantizer 102 or 104, CIM array 106, de-quantizer 108, encoder 400, encoder 500, decoder 600 or decoder 800 to effectively implement one or more operations of at least method 200 during operation of integrated circuit 100, quantizer 102 or 104, CIM array 106, de-quantizer 108, encoder 400, encoder 500, decoder 600 or decoder 800.

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer read circuits are connected. Network interface 912 includes wireless network interfaces such as BLUETOOTH, WIFI, WIMAX, GPRS, or WCDMA; or wired network interface such as ETHERNET, USB, or IEEE-884. In some embodiments, at least method 200 is implemented in two or more systems 900, and information such as table, parity check matrix, set of data, set of check bits, syndrome, set of signals and user interface are exchanged between different systems 900 by network 914.

System 900 is configured to receive information related to a table through I/O interface 910 or network interface 912. The information is transferred to processor 902 by bus 908 to determine table values for generating the decimal values, integer values, floating point number values and quantized floating point number values (e.g., table 300E). The table values are then stored in computer readable medium 904 as table 916. In some embodiments, table 916 includes table 300E.

System 900 is configured to receive information related to a set of signals through I/O interface 910 or network interface 912. The information is stored in computer readable medium 904 as set of signals 918. In some embodiments, the set of signals 918 includes at least the set of received signals FP1 or FP2, the set of signals INT1, INT2, INT3, INT4, FP3, the set of positive numbers PI1, set of position signals LIP, the set of exponent signals EXP2, the set of sign bits BS1, the bias signal BIAS, set of inverted signals INT4B, set of positive signals PI1, set of position signals PI2, shifted portion signal SPI1, padded zeros signal ZP, set of shifted signals SPI1, exponent signal EXP1, mantissa signal MS1, set of enable signals EN, reference signal REF, set of signals FPin, maximum value adjustment signal MO, maximum value adjustment Max_out of one or more of FIGS. 1-9 or at least method 200.

System 900 is configured to receive information related to shift bits through I/O interface 910 or network interface 912. The information is stored in computer readable medium 904 as shift bits 920. In some embodiments, the shift bits 920 includes at least shift bits signal WS1, IS1, BS2 or SB1 or one or more of FIGS. 1-9 or at least method 200.

System 900 is configured to receive information related to a user interface through I/O interface 910 or network interface 912. The information is stored in computer readable medium 904 as user interface 922.

In some embodiments, at least a portion of method 200 is implemented as a standalone software application for execution by a processor. In some embodiments, at least a portion of method 200 is implemented as a software application that is a part of an additional software application. In some embodiments, at least a portion of method 200 is implemented as a plug-in to a software application. In some embodiments, at least a portion of method 200 is implemented as a software application that is a portion of a neural network tool. In some embodiments, at least a portion of method 200 is implemented as a software application that is used by a neural network tool.

In some embodiments, one or more of the operations of method 200 is not performed. Furthermore, various logic circuits shown in FIGS. 1-9 are for illustration purposes. Embodiments of the disclosure are not limited to a particular logic circuits, and one or more of the logic circuits shown in FIGS. 1-9 can be substituted with a one or more corresponding logic circuits of a different function or an equivalent function. Similarly, the low or high logical value of various signals used in the above description is also for illustration. Embodiments of the disclosure are not limited to a particular logical value when a signal is activated and/or deactivated. Selecting different logical values is within the scope of various embodiments. Selecting different numbers of logic circuits in FIGS. 1-9 is within the scope of various embodiments.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to an integrated circuit. The integrated circuit includes a first encoder, a compute in-memory (CIM) array and a de-encoder. The first encoder is configured to quantize a first received signal into a first signal. The first received signal has a first floating point number format. The first signal has an integer number format. The compute in-memory (CIM) array is coupled to the first encoder. The CIM array is configured to generate a CIM signal in response to at least the first signal. The CIM signal has the integer number format. The de-encoder is coupled to the CIM array, and is configured to generate a first output signal in response to the CIM signal. The first output signal has a second floating point number format.

Another aspect of this description relates an integrated circuit. The integrated circuit includes a first quantizer, a second quantizer, a CIM array and a de-quantizer.

In some embodiments, the first quantizer is configured to generate a first set of signals in response to a first set of received signals, the first set of signals having an integer number format, and the first set of received signals having a first floating point number format. In some embodiments, the second quantizer is configured to generate a second set of signals in response to a second set of received signals, the second set of signals having the integer number format, and the second set of received signals having the first floating point number format. In some embodiments, the compute in-memory (CIM) array is coupled to the first quantizer and the second quantizer, the CIM array configured to generate a set of CIM signals in response to the first set of signals and the second set of signals, the set of CIM signals having the integer number format. In some embodiments, the de-quantizer is coupled to the CIM array, and configured to generate a first set of output signals in response to the set of CIM signals, the first set of output signals having a second floating point number format.

Still another aspect of this description relates to a method of operating an integrated circuit. In some embodiments, the method includes encoding, by a first encoder, a first floating point number to a first integer; encoding, by a second encoder, a second floating point number to a second integer; generating, by a compute in-memory (CIM) array, a third integer in response to at least the first integer and the second integer, the CIM array being coupled to the first encoder and the second encoder; and decoding, by a de-encoder, the third integer to a third floating point number.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:

a first encoder configured to quantize a first received signal into a first signal, the first received signal having a first floating point number format, and the first signal having an integer number format;

a compute in-memory (CIM) array coupled to the first encoder, the CIM array configured to generate a CIM signal in response to at least the first signal, the CIM signal having the integer number format; and a de-encoder coupled to the CIM array, and configured to generate a first output signal in response to the CIM signal, the first output signal having a second floating point number format, wherein the de-encoder comprises a detector circuit configured to generate the first output signal in response to a positive signal, a first adjustment signal and a second adjustment signal, wherein the first output signal includes a first, second, third and fourth portion of the first output signal;

wherein the detector circuit comprises:

a first adder/subtractor circuit coupled to the first encoder, and configured to generate a third adjustment signal in response to the first adjustment signal and the second adjustment signal;

a second adder/subtractor circuit coupled to the first encoder, and configured to generate a first exponent signal in response to the first adjustment signal, the second adjustment signal, a first position signal and a bias signal;

a set of multiplexers coupled to a reversible adder circuit, and configured to generate a second position signal in response to the positive signal, the second position signal identifying at least a position of a first value in the positive signal or positions of a second value in the positive signal, the second value being inverted from the first value;

a set of AND logic gates coupled to the set of multiplexers and the second adder/subtractor circuit, and configured to generate the first position signal in response to the second position signal;

a first shift register coupled to the first adder/subtractor circuit, and configured to generate the second portion of the first output signal in response to the third adjustment signal and the positive signal; and a first register coupled to at least the second adder/subtractor circuit and the first shift register, and configured to store the first, second, third and fourth portion of the first output signal, and to output the first output signal.

2. The integrated circuit of claim 1, wherein the first encoder comprises:

a maximum detector circuit configured to detect a maximum value of a first portion of the first received signal; and a shifting circuit coupled to the maximum detector circuit, and configured to generate the first signal in response to the maximum value of the first portion of the first received signal and a second portion of the first received signal, wherein the first portion of the first received signal corresponds to a first exponent of the first floating point number format, and the second portion of the first received signal corresponds to a first mantissa of the first floating point number format, and a third portion of the first received signal corresponds to a first sign bit of the first floating point number format.

3. The integrated circuit of claim 2, wherein the maximum detector circuit comprises:

a set of comparators configured to compare each bit of the first portion of the first received signal thereby generating the maximum value of the first portion of the first received signal; and a second register coupled to the set of comparators, and configured to store the maximum value of the first portion of the first received signal.

4. The integrated circuit of claim 3, wherein the shifting circuit comprises:

a third adder/subtractor circuit coupled to the second register, and configured to generate the first adjustment signal in response to the maximum value of the first portion of the first received signal and the first portion of the first received signal; and a second shift register coupled to the third adder/subtractor circuit, and configured to generate the first signal in response to the first adjustment signal and the second portion of the first received signal, wherein the first mantissa of the first floating point number format that corresponds to the second portion of the first received signal is shifted by the first adjustment signal in a first direction.

5. The integrated circuit of claim 4, wherein the de-encoder further comprises:

an absolute value detector circuit configured to generate the positive signal and a sign bit in response to the CIM signal, the positive signal being an absolute value of the CIM signal, and the sign bit is a corresponding sign of the CIM signal;

wherein the first portion of the first output signal corresponds to a second exponent of the second floating point number format, the second portion of the first output signal corresponds to a first portion of a second mantissa of the second floating point number format, the third portion of the first output signal corresponds to a second sign bit of the second floating point number format, and the fourth portion of the first output signal corresponds to a zero padded portion of a second portion of the second mantissa.

6. The integrated circuit of claim 5, wherein the absolute value detector circuit comprises:

a first comparator configured to generate an enable signal in response to the CIM signal and a reference signal; and a set of inverters configured to receive the CIM signal and to generate an inverted CIM signal; and the reversible adder circuit is further coupled to the first comparator and the set of inverters, and configured to generate the positive signal in response to at least the enable signal and the inverted CIM signal, wherein the enable signal is configured to enable the reversible adder circuit.

7. The integrated circuit of claim 6, wherein the first exponent signal corresponds to the second exponent of the second floating point number format, and wherein the second mantissa of the second floating point number format that corresponds to the second portion of the first output signal is shifted by the third adjustment signal in a second direction opposite from the first direction.

8. An integrated circuit, comprising:

a first quantizer configured to generate a first set of signals in response to a first set of received signals, the first set of signals having an integer number format, and the first set of received signals having a first floating point number format;

a second quantizer configured to generate a second set of signals in response to a second set of received signals, the second set of signals having the integer number format, and the second set of received signals having the first floating point number format;

a compute in-memory (CIM) array coupled to the first quantizer and the second quantizer, the CIM array configured to generate a set of CIM signals in response to the first set of signals and the second set of signals, the set of CIM signals having the integer number format; and a de-quantizer coupled to the CIM array, and configured to generate a first set of output signals in response to the set of CIM signals, the first set of output signals having a second floating point number format, wherein the de-quantizer comprises a detector circuit configured to generate the first set of output signals in response to a set of positive signals, a first set of adjustment signals and a second set of adjustment signals, wherein the first set of output signals includes a first sub-set of output signals, a second sub-set of output signals, a third sub-set of output signals and a fourth sub-set of output signals;

wherein the detector circuit comprises:

a first adder/subtractor circuit coupled to at least the first quantizer, and configured to generate a third set of adjustment signals in response to the first set of adjustment signals and the second set of adjustment signals;

a second adder/subtractor circuit coupled to at least the first quantizer, and configured to generate a first set of exponent signals in response to the first set of adjustment signals, the second set of adjustment signals, a first set of position signals and a bias signal;

a set of multiplexers coupled to a reversible adder circuit, and configured to generate a second set of position signals in response to the set of positive signals, the second set of position signals identifying at least a position of a first value in the set of positive signals or positions of a second value in the set of positive signals, the second value being inverted from the first value;

a set of AND logic gates coupled to the set of multiplexers and the second adder/subtractor circuit, and configured to generate the first set of position signals in response to the second set of position signals;

a first shift register coupled to the first adder/subtractor circuit, and configured to generate the second sub-set of output signals of the first set of output signals in response to the third set of adjustment signals and the set of positive signals; and a first register coupled to at least the second adder/subtractor circuit and the first shift register, and configured to store the first sub-set of output signals, the second sub-set of output signals, the third sub-set of output signals and the fourth sub-set of output signals, and to output the first set of output signals.

9. The integrated circuit of claim 8, wherein the first quantizer comprises:

a maximum detector circuit configured to detect a maximum value of a first sub-set of received signals of the first set of received signals; and a shifting circuit coupled to the maximum detector circuit, and configured to generate the first set of signals in response to the maximum value and a second sub-set of received signals of the first set of received signals, wherein each signal of the first sub-set of received signals corresponds to a first exponent of the first floating point number format, and each signal of the second sub-set of received signals corresponds to a first mantissa of the first floating point number format, and each signal of a third sub-set of received signals corresponds to a first sign bit of the first floating point number format.

10. The integrated circuit of claim 9, wherein the maximum detector circuit comprises:

a set of comparators configured to compare each signal of the first sub-set of received signals of the first set of received signals thereby generating the maximum value of the first sub-set of received signals of the first set of received signals; and a second register coupled to the set of comparators, and configured to store the maximum value of the first sub-set of received signals of the first set of received signals.

11. The integrated circuit of claim 10, wherein the shifting circuit comprises:

a third adder/subtractor circuit coupled to the second register, and configured to generate the first set of adjustment signals in response to the maximum value of the first sub-set of received signals of the first set of received signals and the first sub-set of received signals of the first set of received signals; and a second shift register coupled to the third adder/subtractor circuit, and configured to generate the first set of signals in response to the first set of adjustment signals and the second sub-set of received signals of the first set of received signals, wherein the first mantissa of the first floating point number format that corresponds to each signal of the second sub-set of received signals is shifted by a corresponding adjustment signal of the first set of adjustment signals in a first direction.

12. The integrated circuit of claim 11, wherein the de-quantizer further comprises:

an absolute value detector circuit configured to generate the set of positive signals and a set of sign bits in response to the set of CIM signals, each signal of the set of positive signals is an absolute value of a corresponding CIM signal of the set of CIM signals, and each sign bit of the set of sign bits is a corresponding sign of the corresponding CIM signal of the set of CIM signals;

wherein each output signal of the first sub-set of output signals corresponds to a second exponent of the second floating point number format, each output signal of the second sub-set of output signals corresponds to a second mantissa of the second floating point number format, each output signal of the third sub-set of output signals corresponds to a second sign bit of the second floating point number format, and each output signal of the fourth sub-set of output signals corresponds to a zero padded portion of the second floating point number format.

13. The integrated circuit of claim 12, wherein the absolute value detector circuit comprises:

a first comparator configured to generate an enable signal in response to the set of CIM signals and a reference signal; and a set of inverters configured to receive the set of CIM signals and to generate an inverted set of CIM signals; and the reversible adder circuit is further coupled to the first comparator and the set of inverters, and configured to generate the set of positive signals in response to the enable signal and the inverted set of CIM signals, wherein the enable signal is configured to enable the reversible adder circuit.

14. The integrated circuit of claim 13, the first set of exponent signals corresponds to the second exponent of the second floating point number format, and wherein the second mantissa of the second floating point number format that corresponds to each output signal of the second sub-set of output signals is shifted by a corresponding adjustment signal of the third set of adjustment signals in a second direction opposite from the first direction.

15. The integrated circuit of claim 8, wherein the second quantizer comprises:

a maximum detector circuit configured to detect a maximum value of a first sub-set of received signals of the second set of received signals; and a shifting circuit coupled to the maximum detector circuit, and configured to generate the second set of signals in response to the maximum value and a second sub-set of received signals of the second set of received signals, wherein each signal of the first sub-set of received signals corresponds to a first exponent of the first floating point number format, and each signal of the second sub-set of received signals corresponds to a first mantissa of the first floating point number format, and each signal of a third sub-set of received signals corresponds to a first sign bit of the first floating point number format.

16. The integrated circuit of claim 15, wherein the maximum detector circuit comprises:

a set of comparators configured to compare each signal of the first sub-set of received signals of the second set of received signals thereby generating the maximum value of the first sub-set of received signals of the second set of received signals; and a second register coupled to the set of comparators, and configured to store the maximum value of the first sub-set of received signals of the second set of received signals.

17. The integrated circuit of claim 16, wherein the shifting circuit comprises:

a third adder/subtractor circuit coupled to the second register, and configured to generate the first set of adjustment signals in response to the maximum value of the first sub-set of received signals of the second set of received signals and the first sub-set of received signals of the second set of received signals; and a second shift register coupled to the third adder/subtractor circuit, and configured to generate the second set of signals in response to the first set of adjustment signals and the second sub-set of received signals of the second set of received signals, wherein the first mantissa of the first floating point number format that corresponds to each signal of the second sub-set of received signals is shifted by a corresponding adjustment signal of the first set of adjustment signals in a first direction.

18. A method of operating an integrated circuit, the method comprising:

encoding, by a first encoder, a first floating point number to a first integer;

encoding, by a second encoder, a second floating point number to a second integer;

generating, by a compute in-memory (CIM) array, a third integer in response to at least the first integer and the second integer, the CIM array being coupled to the first encoder and the second encoder; and decoding, by a de-encoder, the third integer to a third floating point number, wherein decoding the third integer to the third floating point number comprises:

determining, by a detector circuit, the third floating point number in response to a positive signal, a first adjustment signal and a second adjustment signal;

wherein the third floating point number is a first output signal, and the first output signal includes a first, second, third and fourth portion of the first output signal; and wherein the detector circuit comprises:

a first adder/subtractor circuit coupled to the first encoder, and configured to generate a third adjustment signal in response to the first adjustment signal and the second adjustment signal;

a second adder/subtractor circuit coupled to the first encoder, and configured to generate a first exponent signal in response to the first adjustment signal, the second adjustment signal, a first position signal and a bias signal;

a set of multiplexers coupled to a reversible adder circuit, and configured to generate a second position signal in response to the positive signal, the second position signal identifying at least a position of a first value in the positive signal or positions of a second value in the positive signal, the second value being inverted from the first value;

a set of AND logic gates coupled to the set of multiplexers and the second adder/subtractor circuit, and configured to generate the first position signal in response to the second position signal;

a first shift register coupled to the first adder/subtractor circuit, and configured to generate the second portion of the first output signal in response to the third adjustment signal and the positive signal; and a first register coupled to at least the second adder/subtractor circuit and the first shift register, and configured to store the first, second, third and fourth portion of the first output signal, and to output the first output signal.

19. The method of claim 18, wherein encoding the first floating point number to the first integer comprises:

quantizing the first floating point number to a first binary format; and shifting, by a second shift register, the first binary format of the first floating point number by a first number of shift bits thereby obtaining the first integer;

encoding the second floating point number to the second integer comprises:

quantizing the second floating point number to a second binary format; and shifting, by a third shift register, the second binary format of the second floating point number by a second number of shift bits thereby obtaining the second integer.

20. The method of claim 19, wherein decoding the third integer to the third floating point number further comprises:

determining, by an absolute value detector circuit, the positive signal and a sign bit in response to the third integer, the positive signal being an absolute value of the third integer, and the sign bit is a corresponding sign of the third integer;

wherein the detector circuit being coupled to the absolute value detector circuit.

* * * * *